United States Patent
Morone et al.

(10) Patent No.: US 11,834,532 B2
(45) Date of Patent: Dec. 5, 2023

(54) PHOTOINITIATORS

(71) Applicant: IGM RESINS ITALIA S.R.L., Milan (IT)

(72) Inventors: Marika Robert Morone, Lipomo (IT); Gabriele Norcini, Comabbio (IT); Gianni Casaluce, Turate (IT); Andrea Bernini Freddi, Gavirate VA (IT); Stephen Postle, Glen Rock, NJ (US)

(73) Assignee: IGH RESINS ITALIA S.R.L., Milan (IT)

( * ) Notice: Subject to any disclaimer, the term of this patent is extended or adjusted under 35 U.S.C. 154(b) by 64 days.

(21) Appl. No.: 17/296,343

(22) PCT Filed: Dec. 20, 2019

(86) PCT No.: PCT/IB2019/061152
§ 371 (c)(1),
(2) Date: May 24, 2021

(87) PCT Pub. No.: WO2020/136522
PCT Pub. Date: Jul. 2, 2020

(65) Prior Publication Data
US 2022/0098333 A1  Mar. 31, 2022

(30) Foreign Application Priority Data
Dec. 28, 2018  (IT) .................. 102018000021388

(51) Int. Cl.
*C08F 2/50* (2006.01)
*C08F 2/44* (2006.01)
*C09D 11/101* (2014.01)

(52) U.S. Cl.
CPC .................. *C08F 2/50* (2013.01); *C08F 2/44* (2013.01); *C09D 11/101* (2013.01)

(58) Field of Classification Search
CPC ............. C08F 2/50; C08F 2/44; C09F 11/101
See application file for complete search history.

(56) References Cited

U.S. PATENT DOCUMENTS 11,320,429 B1 * 5/2022 Strongin .......... G01N 33/54386

FOREIGN PATENT DOCUMENTS

| CN | 108135781 A * | 6/2018 | ........... A61K 6/0017 |
| EP | 0003002 | 7/1979 | |
| EP | 1411095 A2 * | 4/2004 | ........... C09D 183/06 |
| WO | WO-03066687 A2 * | 8/2003 | ................ C08F 2/46 |
| WO | WO-03066688 A1 * | 8/2003 | ................ C08F 2/50 |
| WO | WO-2014086000 A1 * | 6/2014 | ................ C07F 5/02 |
| WO | WO-2015067815 A1 * | 5/2015 | ........... A61K 6/0052 |

OTHER PUBLICATIONS

International Search Report issued by the EPO dated May 26, 2020 for International patent application No. PCT/IB2019/061152.
Search Report issued by the UIBM dated Aug. 29, 2019 for Italian Priority application No. 102018000021388.
J. Lalevée et al: "Silyl Radical Chemistry and Conventional Photoinitiators: A Route far the Design of Efficient Systems", Macromolecules, voi. 42, No. 16, Aug. 25, 2009 (Aug. 25, 2009), pp. 6031-6037, XP055616278, Washington, DC, United States.
Jacques Lalevee et al: "Radical photopolymerization reactions under air upon lamp and diade laser exposure: The input of the organosilane radical chemistry", Progress in Organic Coatings, voi. 70, No. 2-3, Feb. 1, 2011 (Feb. 1, 2011), pp. 83-90, XP055616287, NL.

* cited by examiner

*Primary Examiner* — Sanza L. McClendon

(57) ABSTRACT

The present invention relates to a novel serie of α-disilyloxyketones, which are useful as photoinitiators (PIs), and to compositions comprising said photoinitiators.

16 Claims, No Drawings

PHOTOINITIATORS

This application is a U.S. national stage of PCT/IB2019/061152 filed on 20 Dec. 2019 which claims priority to and the benefit of Italian Application No. 102018000021388 filed on 28 Dec. 2018 the contents of which are incorporated herein by reference in their entireties.

PRIOR ART AND TECHNICAL BACKGROUND

The dynamic growth of UV curing is dependent on continued innovation to support this technology in the overcaming of always new challenges and this is reflected by rapid development of new materials needed for the formulations. In particular one key component is the photoinitiator, its role is that to convert light to chemical energy in the form of reactive intermediates. These intermediates are radicals able to initiate radical polymerization of the double bonds present in the formulation to be cured. The development in the field of photoinitiators are stimulated by various factors. Firstly, there is a continuous improvement of photoinitiators for existing applications such as coatings, inks, adhesives or electronics because there is no single photoinitiator that is able to meet all the requirements of each application, like for instance line speed, surface curing, discoloration after curing or solubility. Secondly, the introduction of new lamps, such as LED lamps, stimulated the development of photoinitiators tuned at that wavelength. Thirdly, the inscreasing number of photoinitiators banned as toxic or reprotoxic.

In the last years, various attempts were made to develop new photoinitiators able to mimic standard photoinitiators or to overcome problems such as yellowing, higher line speed, curing under LED lamps, deep curing, some examples are 3-ketocoumarins (US9951034, WO/2017/216699), acylgermanium photoinitiators (EP3150641, EP2649981), benzoyl phenyltelluride PIs (Macromolecules, 2014, 47(16), 5526-5531), silicon based PIs (JP2010229169, Macromolecules, 2009, 42(16), 6031-6037, Macromolecules 2007, 40(24), 8527-8530, Macromol. Rapid Commun. 2017, 38, 1600470, Macromolecules, 2017, 50(17), 6911-6923).

In particular, the class of silicon based PIs was widely explored but unfortunately none of known PIs was able to significantly improve at least one of the characteristic cited before. One of the first class of silicon based PIs explored in recent years, was that of the α-disilyloxyketones, which comes from the α-hydroxyketones class but the reactivity compared to that of the parent compound was poorer or comparable and neither the absorption wavelength was positively affected by the disilyloxy substitution.

AIMS OF THE INVENTION

It is a first aim of the invention to provide for novel photocurable compositions comprising α-disilyloxyketones which are higher performing with respect to known α-disilyloxyarylketones containing compositions.

It is a further aim of the invention to provide for novel α-disilyloxyarylketones, their use as photoinitiators and photocurable compositions comprising them.

Is a further aim of the invention to provide for a process for photocuring ethylenically unsaturated compounds as well as articles of manufacture made by said process.

SUMMARY OF THE INVENTION

Now, we surprisiling found that an electron donating aromatic group conjugated to the α-disilyloxyketone gives rise to new PIs which are highly reactive compared to the α-disilyloxyarylketones described in the prior art (PI-1 Macromolecules, 2009, 42(16), 6031-6037).

Indeed, it was unexpectedly found that the substitution by an electrondonating group on the aryl moiety of the α-disilyloxyarylketones, such as diphenylsulfide or p-morpholinophenyl, results in better perfoming photoinitiators, with a reactivity double to the reference compound above (PI-1).

Moreover, we have surprisingly found that all the compounds belonging to the α-disilyloxyarylketone class can be sensitized thus improving the spectral working wavelength and allowing all said compounds working at LED wavelengths (e.g. 400 nm) (which effect was not known), while this result cannot be achieved with other PIs such as α-hydroxyketones. Therefore the addition of a sensitizer in a photocurable composition comprising α-disilyloxyarylketone as the PIs, allows to obtain an unexpected technical improvement, as it will be apparent from the following experimental Examples.

DESCRIPTION OF THE INVENTION

According to one of its aspects, the present invention relates to a photocurable composition comprising:
a) from 50 to 99.9% by weight, preferably from 70 to 98.9% by weight, of the solids content, excluding water or solvent, of at least one ethylenically unsaturated compound;
b) from 0.1 to 35% by weight, preferably from 0.1 to 20% by weight, and more preferably from 0.2 to 15% by weight, of the solids content, excluding water or solvent, of at least one compound of formula (I) and/or (II)

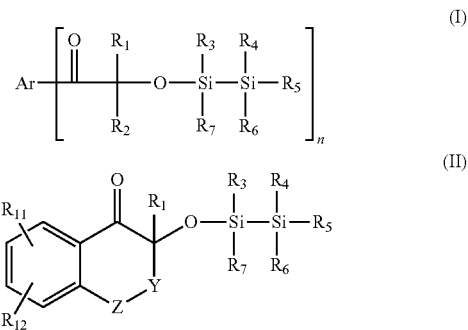

wherein:
n is 1 or 2;
when n is 1, Ar is selected form:
  a C6-C12 aryl which is unsubstituted or substituted by one or more substituents selected from the group consisting of halogens, —CN, —COOH, —OH, C1-C18 alkyl, -Oalkyl, -Oalkoxy, —Ophenyl, —SH, —Salkyl, —Salkoxy, —Sphenyl, —SOalkyl, —SO$_2$alkyl, —SO$_2$alkoxy, —SO$_2$phenyl, —COOalkyl, SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl, —NHCOphenyl; and
  one of the following groups pyridyl, thienyl, 2-methylthienyl, pyrryl, furyl, indanyl, imidazolyl, thiazolyl, oxazolyl, tetrahydronaphthyl, naphthyl, benzothienyl, benzopyrryl, benzofuryl, benzoimidazolyl, benzothiazolyl, benzoxazolyl, 3,4-ethylenedioxythiophene, carbazolyl, N-alkylcarbazolyl, thianthrenyl, phenoxathiinyl, phenothiazinyl, phenoxazinyl, 5,10-dihydrophenazinyl; all said groups being possibly substituted by one or more electrodonating groups;

when n is 2, Ar is selected from a C6-C12 arylene group, a C6-C12 heteroarylene group, and a -arylene-T-arylene-group such as a -phenylene-T-phenylene-group and a trimethyl-phenyl-indane group such as the one of formula

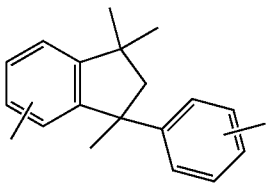

all said groups being possibly substituted by one or more electrodonating groups;

Y is selected from a direct bond, —CH$_2$—, —CH$_2$—CH$_2$—, —O—, —S— and —Nalkyl;

Z is selected from a directe bond, —O—, —S—, —SO$_2$—, —Nalk, —CH$_2$— and —C(CH$_3$)$_2$;

T is selected from a direct bond, —O—, —S—, —SO$_2$—, —CH$_2$—, —CH$_2$CH$_2$—, —CH$_2$OCH$_2$— and —CH=CH—;

$R_1$ is selected from, C1-C8 alkyl which is unsubstituted or substituted by C2-C8acyloxy, —NR$_8$R$_9$, —COOalkyl, or —CN, or represents C3-C5alkenyl, C5-C12cycloalkyl, phenyl and benzyl;

$R_2$ is selected from $R_1$ or $R_2$ represents a —CH$_2$CH$_2$R$_{10}$ group; or $R_1$ and $R_2$, together with the carbon atom to which they are bound, represent C5-C12cycloalkyl, C2-C8-alkylene or C3-C9oxa- or aza-alkylene;

$R_3$, $R_4$, $R_5$, $R_6$ and $R_7$, each independently, are selected from
  phenyl, C1-C8alkyl, both being unsubstituted or substituted by —OH, —Oalkyl, C2-C8acyloxy, —NR$_8$R$_9$, —COOalkyl or CN; and
  Oalkyl;

$R_8$ and $R_9$, each indipendently, are selected from C1-C18alkyl which is unsubstituted or substituted by —OH, —Oalkyl, or —CN;

$R_{10}$ is selected from —CONH$_2$, —CONHalkyl, —CON(alkyl)$_2$ and P(=O)(Oalkyl)$_2$ $R_{11}$ is selected from hydrogen, halogen, —CN, —COOH, —OH, C1-C18 alkyl, —Oalkyl, —Oalkoxy, —Ophenyl, —SH, —Salkyl, —Salkoxy, —Sphenyl, —SOalk, —SO$_2$alkyl, —SO2alkoxy, —SO$_2$phenyl, —COOalkyl, SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl and —NHCOphenyl;

$R_{12}$ has one of the meanings assigned to $R_{11}$;

or $R_{11}$ and $R_{12}$, together with the carbon atoms to which they are bound, represent C5-C12cycloalkyl or C6-C12 aryl;

c) from 0.01 to 15% by weight, preferably from 0.01 to 10% by weight, and more preferably from 0.02 to 8% by weight, of the solids content, excluding water or solvent, of at least one photosensitizer from the group of aromatic carbonyl compounds having triplet energy of 225-310 kJ/mol.

According to another of its aspects, the present invention relates to photoinitiators of formula (Ia) and (II):

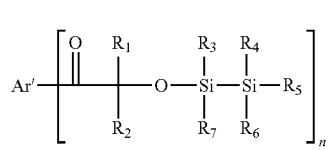

(Ia)

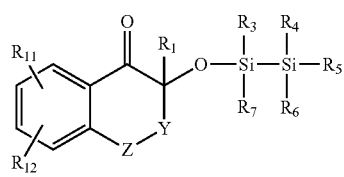

(II)

wherein:

n is 1 or 2;

when n is 1, Ar' is selected form one of the following groups: C6-C12 aryl, thienyl; 2-methylthienyl; furyl; indanyl; thiazolyl; oxazolyl; tetrahydronaphthyl; benzothienyl; benzopyrryl; benzofuryl; carbazolyl; N-alkylcarbazolyl; thianthrenyl; phenoxathiinyl; phenothiazinyl; phenoxazinyl; and 5,10-dihydrophenazinyl; all said groups being possibly substituted by one or more electrodonating groups; provided that when C6-C12 aryl is a phenyl group then said phenyl group is always substituted by one or more electrodonating groups;

when n is 2, Ar is selected from a C6-C12 arylene group, a C6-C12 heteroarylene group, and a -arylene-T-arylene-group such as a -phenylene-T-phenylene-group and a trimethyl-phenyl-indane group such as the one of formula

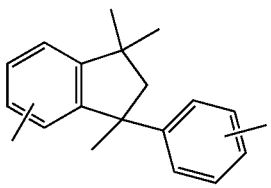

all said groups being possibly substituted by one or more electrodonating groups;

Y is selected from a direct bond, —CH$_2$—, —CH$_2$—CH$_2$—, —O—, —S— and —Nalkyl;

Z is selected from a directe bond, —O—, —S—, —SO$_2$—, —Nalk, —CH$_2$— and —C(CH$_3$)$_2$;

T is selected from a direct bond, —O—, —S—, —SO$_2$—, —CH$_2$—, —CH$_2$CH$_2$—, —CH$_2$OCH$_2$— and —CH=CH—;

$R_1$ is selected from hydrogen, C1-C8 alkyl which is unsubstituted or substituted by C2-C8acyloxy, —NR$_8$R$_9$, —COOalkyl; or —CN, or $R_1$ represents C3-C5alkenyl, C5-C12cycloalkyl, phenyl and benzyl;

$R_2$ is selected from $R_1$ or $R_2$ represents a —CH$_2$CH$_2$R$_{10}$ group; or $R_1$ and $R_2$, together with the carbon atom to which they are bound, represent C5-C12cycloalkyl, C2-C8-alkylene or C3-C9oxa- or aza-alkylene;

$R_3$, $R_4$, $R_5$, Re and $R_7$, each independently, are selected from phenyl, C1-C8alkyl, both being unsubstituted or substituted by —OH, —Oalkyl, C2-C8acyloxy, —NR$_8$R$_9$, —COOalkyl or CN; or
Oalkyl;

R$_8$ and R$_9$, each independently, are selected from C1-C18alkyl which is unsubstituted or substituted by —OH, —Oalkyl, or —CN;

R$_{10}$ is selected from —CONH$_2$, —CONHalkyl, —CON(alkyl)$_2$ and —P(O)(Oalkyl)$_2$ R$_{11}$ is selected from hydrogen, halogen, —CN, —COOH, —OH, C1-C18 alkyl, —Oalkyl, —Oalkoxy, —Ophenyl, —SH, —Salkyl, —Salkoxy, —Sphenyl, —SOalk, —SO2alkyl, —SO2alkoxy, —SO2phenyl, —COOalkyl, —SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl and —NHCOphenyl;

R$_{12}$ has one of the meanings assigned to R$_{11}$;

or R$_{11}$ and R$_{12}$, together with the carbon atoms to which they are bound, represent C5-C12cycloalkyl or C6-C12 aryl;

and wherein:
when R$_1$ and R$_2$, together with the carbon atom to which they are bound represent C5-C12cycloalkyl, C2-C8-alkylene or C3-C9oxa- or aza-alkylene, then Ar' can also be unsubsituted, preferably a C6-C10cycloalkyl, more preferably a cyclohexyl group.

According to another of its aspects, the present invention relates to a photocurable composition comprising:
a) from 50 to 99.9% by weight, preferably from 70 to 98.9% by weight, of the solids content, excluding water or solvent, of at least one ethylenically unsaturated compound;
b) from 0.1 to 35% by weight, preferably from 0.1 to 20% by weight, and more preferably from 0.2 to 15% by weight, of the solids content, excluding water or solvent, of at least one compound of formula (Ia) and/or (II), as defined above.

According to another of its aspects the invention relates to the use of the compounds of formula (Ia) and (II), as above defined, as photoinitiators. According to another of its aspects the invention relates to a process for photocuring comprising at least one of compounds of formula (I), (Ia) and (II), and to an article of manufacture made by said process.

According to another of its aspects the invention relates to the use of a sensitizer to broaden the spectral working wavelength of disilylarylketones.

DETAILED DESCRIPTION OF THE INVENTION

According to the present invention, the expressions "photocuring" and "photopolymerizing" (and derivative terms thereof) are interchangeable. The "α-disilyloxyarylketones" referred to the compounds of the invention of formula (I), (Ia) and (II), herein includes α-disilyloxyarylketones and α-disilyloxyheteroarylketones as defined in said formulas.

Unless otherwise specified, the expression "substituted phenyl" means a phenyl substituted by one or more electrodonating groups.

Preferably, the electrodonating groups are selected OH, C1-C18 alkyl, —Oalkyl, —Oalkoxy, —Ophenyl, —SH, —Salkyl, —Salkoxy, —Sphenyl, —SO2alkyl, —SO2alkoxy, —SO2phenyl, —COOalkyl, SO2NH2, —SO2NHalkyl, —SO2N(alkyl)2, —NHalkyl, —NHalkoxy, —N(alkyl)2, morfolino, piperidino, piperazino, —N(alkoxy)2, —NHCOalkyl or —NHCOphenyl or represents thienyl, 2-methylthienyl, pyrryl, furyl, indanyl, imidazolyl, thiazolyl, oxazolyl, tetrahydronaphthyl, naphthyl, benzothienyl, benzopyrryl, benzofuryl, benzoimidazolyl, benzothiazolyl, benzoxazolyl, 3,4-ethylenedioxythiophene, mesityl, isopropylphenyl, phenoxyphenyl, p-nonylphenyl, C10-C13alkylphenyl, hydroxyphenyl, tolyl, tert-butylphenyl, xylyl, methoxyphenyl, ethoxyphenyl, phenoxyphenyl, methylthiophenyl, phenylthiophenyl, 4-methoxythioanisole, butylsulfophenyl, phenylsulfophenyl, ethoxycarbonylphenyl, tert-butoxycarbonylphenyl, methylaminosulfophenyl, dipropylaminosulfophenyl, dimethylaminophenyl, 4-morpholinophenyl, benzoylaminophenyl and acetylaminophenyl.

According to a preferred embodiments, in formulas (I), (Ia) and (II) of the present invention:
when n is 1, Ar is selected from phenyl, fluorophenyl, bromophenyl, chlorophenyl, dichlorophenyl, iodophenyl, cyanophenyl, naphthyl, phenanthryl, anthracyl, diphenylyl, mesityl, isopropylphenyl, isopropylchlorophenyl, phenoxyphenyl, p-nonylphenyl, C10-C13alkylphenyl, hydroxyphenyl, tolyl, chlorotolyl, tert-butylphenyl, xylyl, bromoxylyl, methoxyphenyl, ethoxyphenyl, phenoxyphenyl, methylthiophenyl, phenylthiophenyl, 4-methoxythioanisole, butylsulfophenyl, phenylsulfophenyl, ethoxycarbonylphenyl, tert-butoxycarbonylphenyl, methylaminosulfophenyl, dipropylaminosulfophenyl, dimethylaminophenyl, 4-morpholinophenyl, benzoylaminophenyl, acetylaminophenyl, pyridyl thienyl, 2-methylthienyl, furyl, indanyl, thiazolyl, oxazolyl, tetrahydronaphthyl, benzothienyl, benzopyrryl, benzofuryl, carbazolyl, N-alkylcarbazolyl; thianthrenyl, phenoxathiinyl, phenothiazinyl, phenoxazinyl and 5,10-dihydrophenazinyl;

when n is 1, Ar' is selected from
naphthyl, phenanthryl, anthracyl, diphenylyl;
phenyl substituted with one or more electron donating groups, said electrodonating groups being preferably selected from one or more OH, C1-C18 alkyl, —Oalkyl, —Oalkoxy, —Ophenyl, —SH, —Salkyl, —Salkoxy, —Sphenyl, —SO$_2$alkyl, —SO$_2$alkoxy, —SO$_2$phenyl, —COOalkyl, SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl or —NHCOphenyl or represents thienyl, 2-methylthienyl, pyrryl, furyl, indanyl, imidazolyl, thiazolyl, oxazolyl, tetrahydronaphthyl, naphthyl, benzothienyl, benzopyrryl, benzofuryl, benzoimidazolyl, benzothiazolyl, benzoxazolyl, 3,4-ethylenedioxythiophene;
other preferred phenyl substituted with one or more electron donating groups are selected from mesityl, isopropylphenyl, phenoxyphenyl, p-nonylphenyl, C10-C13alkylphenyl, hydroxyphenyl, tolyl, tert-butylphenyl, xylyl, methoxyphenyl, ethoxyphenyl, phenoxyphenyl, methylthiophenyl, phenylthiophenyl, 4-methoxythioanisole, butylsulfophenyl, phenylsulfophenyl, ethoxycarbonylphenyl, tert-butoxycarbonylphenyl, methylaminosulfophenyl, dipropylaminosulfophenyl, dimethylaminophenyl, 4-morpholinophenyl, benzoytaminophenyl, acetylaminophenyl;

C6-C12 arylene are selected from phenylene, naphthylene and diphenylene.

C6-C12 heteroarylene are selected from unsubstituted or substituted benzofuran, carbazole and ketocoumarin groups;

arylene-T-arylenes are preferably selected from phenylene-T-phenylenes such as diphenylmethane, diphenylether and diphenylsulfide; and a trimethyl-phenyl-indane group such as the one of formula

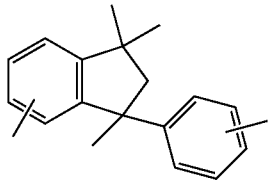

C1-C18 alkyl is selected from a linear or branched, saturated alkyl, which can be unsubstituted or substituted by aryl, alkyl, aryloxy, alkoxy, heteroatoms and/or heterocyclic groups, and includes, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenyl-ethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, methoxybenzyl, 2-hydroxyethyl, 2-hydroxypropyl, 3-hydroxypropyl, 4-hydroxybutyl, 6-hydroxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, 2-methoxycarbonylethyl, 2-ethoxycarbonylethyl, 2-butoxycarbonylpropyl, 1,2-di(methoxycarbonyl) ethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, butylthiomethyl, 2-dodecylthioethyl, 2-phenylthioethyl, 2,2,2-trifluoroethyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, and 6-phenoxyhexyl;

C1-C8 alkyl is selected from a linear or branched, saturated, unsubstituted alkyl group such as, for example, methyl, ethyl, propyl, isopropyl, n-butyl, sec-butyl or tert-butyl, isoamyl, n-hexyl, 2-ethylhexyl or octyl; and C5-C12 cycloalkyl may be unsubstituted or substituted by aryl, alkyl, aryloxy, alkoxy, heteroatoms and/or heterocyclic groups and includes, for example, cyclopentyl, cyclohexyl, cyclooctyl, cyclododecyl, methylcyclopentyl, 2,5-dimethylcyclopentyl, methylcyclohexyl, 2,6-dimethylcyclohexyl, 2,6-diethylcyclohexyl, butylcyclohexyl, methoxycyclohexyl, 2,6-dimethoxycyclohexyl, 2,6-diethoxycyclohexyl, butylthiocyclohexyl, chlorocyclohexyl, 2,6-dichlorocyclohexyl and 2,5-dichlorocyclopentyl; or C5-C12 cycloalkyl may be a saturated or unsaturated, unsubstituted or substituted bicyclic system, for example norbornyl or norbornenyl, a tricyclic system, such as for example adamantyl.

Unless it is expressly indicated, alkyl and alkoxy groups are C1-C6 linear or branched, saturated alkyl or alkoxy, for example C1-C4 groups.

Preferably, n is 1.

Preferably Ar is selected from phenyl or substituted phenyl such as C10-C13alkylphenyl, tolyl, tert-butylphenyl, methoxyphenyl, ethoxyphenyl, phenoxyphenyl, methylthiophenyl, phenylthiophenyl; 4-methoxythioanisole; dimethylaminophenyl; 4-morpholinophenyl; thienyl; 2-methylthienyl; indanyl; thiazolyl; oxazolyl; tetrahydronaphthyl; benzothienyl; benzopyrryl and benzofuryl.

Preferably Ar' is a substituted phenyl with one or more electron donating groups, for example C10-C13alkylphenyl, tolyl, tert-butylphenyl, methoxyphenyl, ethoxyphenyl, phenoxyphenyl, methylthiophenyl, phenylthiophenyl, 4-methoxythioanisole, dimethylaminophenyl, 4-morpholinophenyl.

Preferably Ar' is thienyl, 2-methylthienyl, indanyl, thiazolyl, oxazolyl, tetrahydronaphthyl, benzothienyl, benzopyrryl or benzofuryl.

Preferably at least one of $R_1$ and $R_2$ is not hydrogen, more preferably $R_1$ and $R_2$ are both not hydrogen.

Preferably $R_1$ is methyl, ethyl, propyl or benzyl.

Preferably $R_2$ is methyl, ethyl or propyl or toghether with $R_1$ and the carbon atom to which they are bound, form a C5-C12cycloalkyl.

Preferably Ar' is unsubstituted and $R_1$ and $R_2$ and the carbon atom to which they are bound, form a C5-C12cycloalkyl, preferably a C6-C10cycloalkyl, more preferably a cyclohexyl group.

Preferably $R_3$, $R_4$, $R_5$, $R_6$, $R_7$ are each independently one to one other methyl, ethyl or phenyl.

Preferably $R_{11}$ and $R_{12}$ are hydrogen.

Preferred α-disilyloxyarylketones according to formula (I), (Ia) and (II) are listed in Table 1, for illustrative purposes only, without being limited thereto.

TABLE 1

| PI-1 | 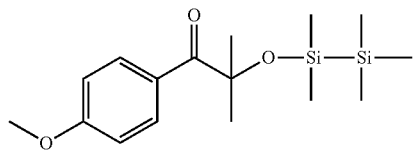 |
|---|---|
| PI-2 | 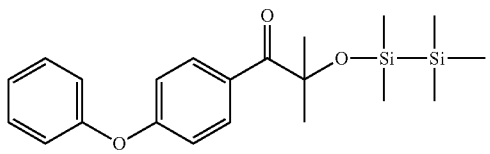 [SMILES: CC(C)(O[Si](C)(C)[Si](C)(C)C)C(=O)c1ccc(Oc2ccccc2)cc1] |

TABLE 1-continued
PI-3
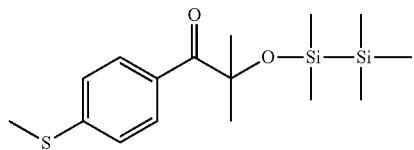
PI-4
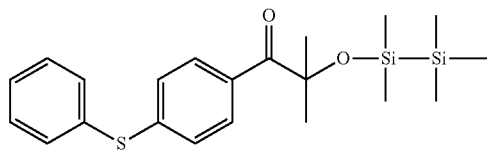 [SMILES: CC(C)(O[Si](C)(C)[Si](C)(C)C)C(=O)c1ccc(Sc2ccccc2)cc1]
PI-5
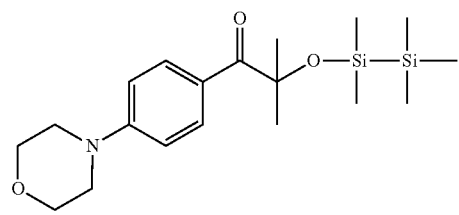 [SMILES: CC(C)(O[Si](C)(C)[Si](C)(C)C)C(=O)c1ccc(N2CCOCC2)cc1]
PI-6
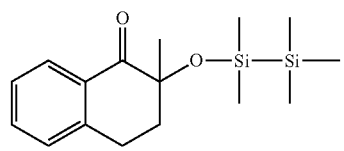 [SMILES: CC1(O[Si](C)(C)[Si](C)(C)C)CCc2ccccc2C1=O]
PI-7
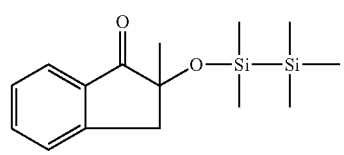 [SMILES: CC1(O[Si](C)(C)[Si](C)(C)C)Cc2ccccc2C1=O]
PI-8
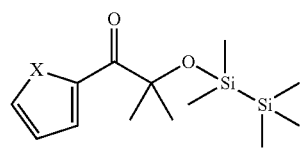
X = O, S, NAlk
PI-9
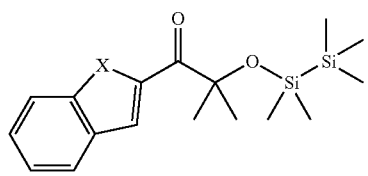
X = O, S, NAlk
PI-10
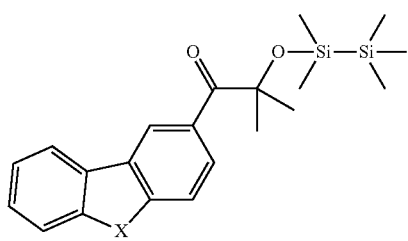
X = O, S, NAlk TABLE 1-continued
PI-11 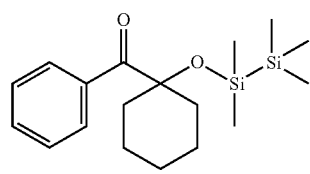 [SMILES: C[Si](C)(C)[Si](C)(C)OC1(C(=O)c2ccccc2)CCCCC1]
PI-12 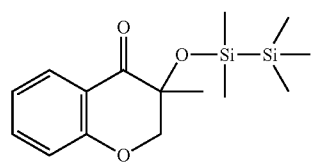 [SMILES: CC1(O[Si](C)(C)[Si](C)(C)C)COc2ccccc2C1=O]
PI-13 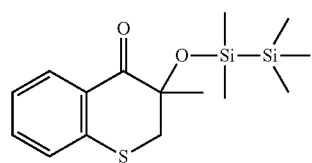 [SMILES: CC1(O[Si](C)(C)[Si](C)(C)C)CSc2ccccc2C1=O]
PI-14 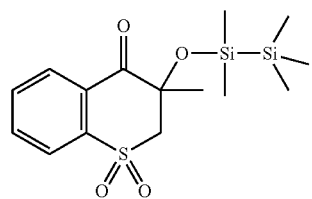 [SMILES: CC1(O[Si](C)(C)[Si](C)(C)C)CS(=O)(=O)c2ccccc2C1=O]
PI-15 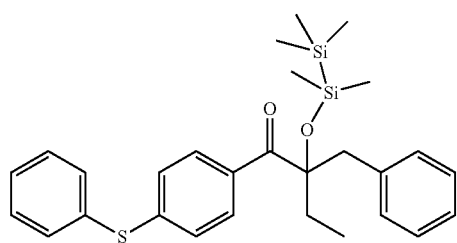 [SMILES: CCC(Cc1ccccc1)(O[Si](C)(C)[Si](C)(C)C)C(=O)c1ccc(Sc2ccccc2)cc1]
PI-16 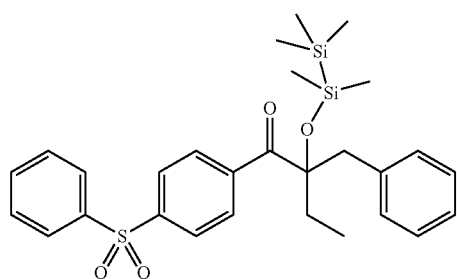 [SMILES: CCC(Cc1ccccc1)(O[Si](C)(C)[Si](C)(C)C)C(=O)c1ccc(S(=O)(=O)c2ccccc2)cc1]
PI-17 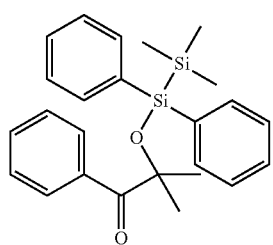 [SMILES: CC(C)(O[Si](c1ccccc1)(c1ccccc1)[Si](C)(C)C)C(=O)c1ccccc1]

TABLE 1-continued
PI-18
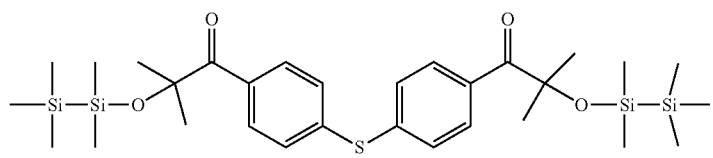
PI-19
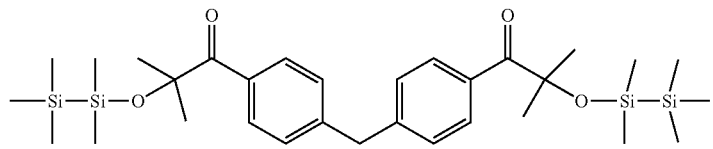
PI-20
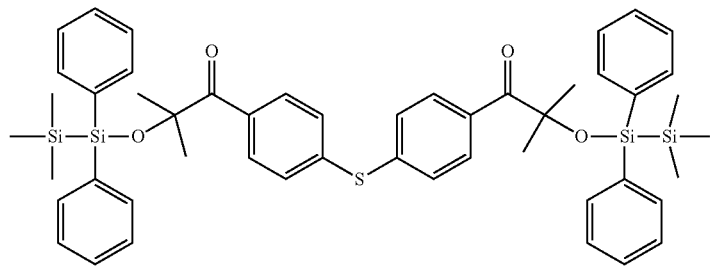
PI-21
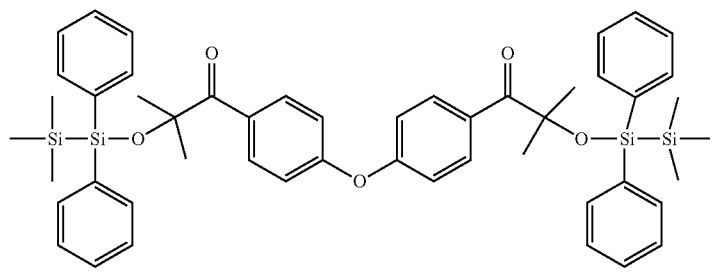
PI-22
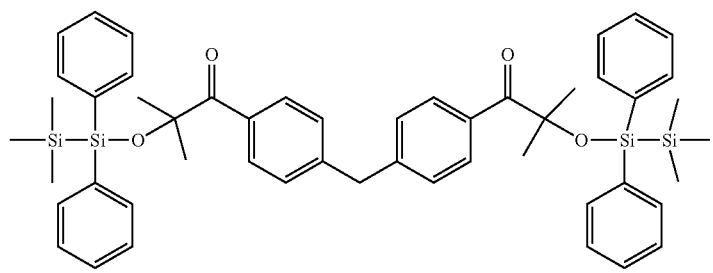
PI-23
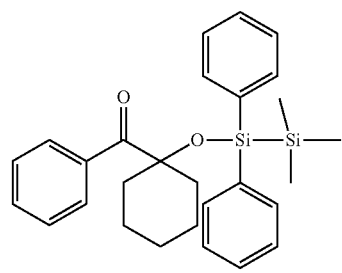 [SMILES: C[Si](C)(C)[Si](OC1(C(=O)c2ccccc2)CCCCC1)(c1ccccc1)c1ccccc1]

TABLE 1-continued
PI-24 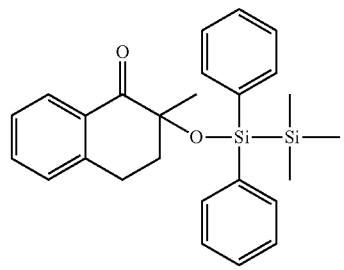 [SMILES: CC1(O[Si](c2ccccc2)(c2ccccc2)[Si](C)(C)C)CCc2ccccc2C1=O]
PI-25 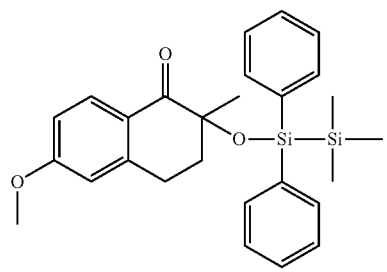 [SMILES: COc1ccc2c(c1)CCC(C)(O[Si](c1ccccc1)(c1ccccc1)[Si](C)(C)C)C2=O]
PI-26 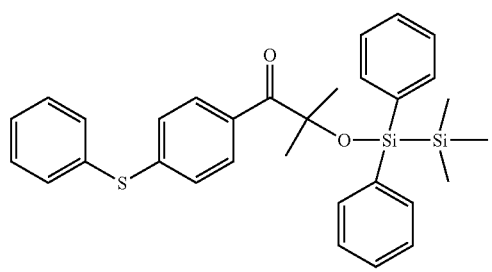 [SMILES: CC(C)(O[Si](c1ccccc1)(c1ccccc1)[Si](C)(C)C)C(=O)c1ccc(Sc2ccccc2)cc1]
PI-27 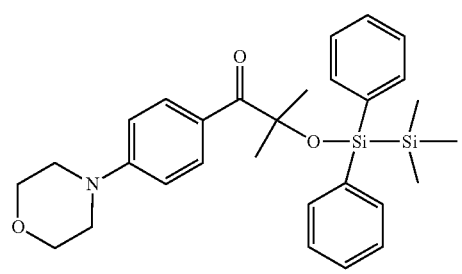 [SMILES: CC(C)(O[Si](c1ccccc1)(c1ccccc1)[Si](C)(C)C)C(=O)c1ccc(N2CCOCC2)cc1]
PI-28 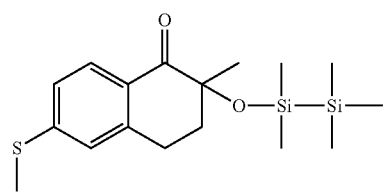 [SMILES: CSc1ccc2c(c1)CCC(C)(O[Si](C)(C)[Si](C)(C)C)C2=O]
PI-29 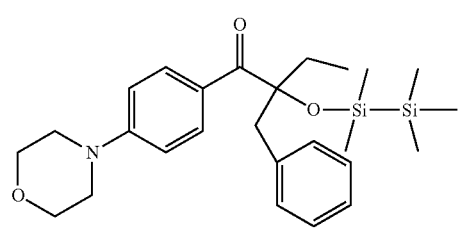 [SMILES: CCC(Cc1ccccc1)(O[Si](C)(C)[Si](C)(C)C)C(=O)c1ccc(N2CCOCC2)cc1]

The compounds of formula (I), (Ia) and (II) can be prepared according conventional method known to the skilled in the art, for example for silylation of the corresponding α-hydroxyketone according to the following Scheme:

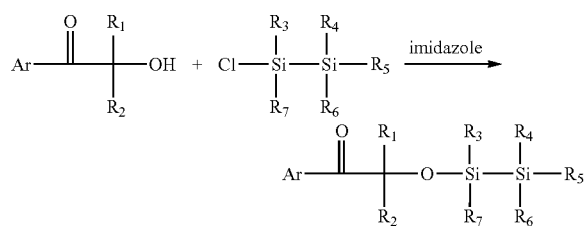

Illustrative synthesis of representative compounds of formula (I), (Ia) and (II) are reported in the examples which follow.

According to the invention, the photoinitiators of formula (I), (Ia) and (II) can be used to prepare photocurable compositions comprising ethylenically unsaturated compounds a).

The unsaturated compound a) can contain one or more olefinic double bonds. They can have low-molecular weight (monomeric) or high-molecular weight (oligomeric).

Examples of suitable low-molecular weight monomers having one double bond are alkyl or hydroxyalkyl acrylates or methacrylates, such as methyl, ethyl, butyl, 2-ethylhexyl or 2-hydroxyethyl acrylate, isobornyl acrylate and methyl or ethyl methacrylate. Also of interest are resins modified with silicon or fluorine, e.g. silicone acrylates. Further examples of these monomers are acrylonitrile, acrylamide, methacrylamide, N-substituted (meth)acrylamides, styrene, alkylstyrenes and halogeno styrenes, vinyl esters such as vinyl acetate, vinyl ethers such as iso-butyl vinyl ether, N-vinylpyrrolidone, vinyl chloride or vinylidene chloride.

Examples of monomers having more than one double bond are the ethylene glycol diacrylate, propylene glycol diacrylate, neopentyl glycol diacrylate, hexamethylene glycol diacrylate, bisphenol A diacrylate, 4,4'-bis-(2-acryloyloxyethoxy)-diphenylpropane, trimethylolpropane triacrylate, pentaerythritol triacrylate or tetraacrylate, vinyl acrylate, divinyl benzene, divinyl succinate, diallyl phthalate, triallyl phosphate, triallyl isocyanurate or tris-(2-acryloylethyl) isocyanurate.

Examples of high-molecular weight (oligomeric) polyunsaturated compounds are acrylated epoxy resins, acrylated or vinyl-ether- or epoxy-group-containing polyesters, acrylated polyurethanes or acrylated polyethers. Further examples of unsaturated oligomers are unsaturated polyester resins which are usually prepared from maleic acid, phthalic acid and one or more diols and which have molecular weights of from about 500 to 3000 Da. Such unsaturated oligomers can also be referred to as prepolymers.

Examples of compounds a), which are particularly suitable for the implementation of the present invention, are esters of ethylenically unsaturated carboxylic acids and polyols or polyepoxides, and polymers containing ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, as well as mixtures of one or more than one such polymers.

Illustrative examples of unsaturated carboxylic acids or anhydrides, useful for the preparation of said esters, are acrylic acid, methacrylic acid, maleic anhydride, crotonic acid, itaconic add, cinnamic acid and unsaturated fatty acids such as linolenic acid and oleic acid. Acrylic and methacrylic acid are preferred.

Polyols which can be esterified are aromatic and aliphatic and cycloaliphatic polyols, preferably aliphatic and cycloaliphatic polyols.

Aromatic polyols are, for example, hydroquinone, 4,4'-dihydroxydiphenyl, 2,2-di(4-hydroxyphenyl) propane, as well as novolaks and resoles. Polyepoxides, which can be esterified, include those based on the said polyols, especially the aromatic polyols and epichlorohydrin. Also suitable as polyols are polymers and copolymers that contain hydroxyl groups in the polymer chain or in side groups, for example polyvinyl alcohol and copolymers thereof or polymethacrylic acid hydroxyalkyl esters or copolymers thereof. Further suitable polyols are oligoesters carrying hydroxyl terminal groups.

Examples of aliphatic and cycloaliphatic polyols include alkylenediols containing preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500 Da, 1,3-cyclopentanediol, 1,2-, 1,3- or 1,4-cyclohexanediol, 1,4-dihydroxymethyl cyclohexane, glycerol, tris(β-hydroxy-ethyl)amine, trimethylolethane, trimethylolpropane, pentaerythritol, dipentaerythritol and sorbitol.

Further suitable ethylenically unsaturated compounds a) are unsaturated polyamides obtained from unsaturated carboxylic acids and aromatic, aliphatic and cycloaliphatic polyamines having preferably from 2 to 6, preferably from 2 to 4, amino groups. Examples of such polyamines are: ethylenediamine, 1,2- or 1,3-propylenediamine, 1,2-, 1,3- or 1,4-butylenediamine, 1,5-pentylenediamine, 1,6-hexylenediamine, octylenediamine, dodecylene diamine, 1,4-diaminocyclohexane, isophoronediamine, phenylene diamine, bisphenylenediamine, di-(β-aminoethyl) ether, diethylene triamine, triethylenetetramine and di(β-aminoethoxy)- and di(β-aminopropoxy)ethane. Other suitable polyamines are polymers and copolymers which may contain additional amino groups in the side chain and oligoamides containing amino end groups.

Specific examples of such unsaturated polyamides are: methylenebisacrylamide, 1,6-hexamethylene bisacrylamide, diethylenetriamine trismethacrylamide, bis(methacrylamidopropoxy) ethane and N—[(β-hydroxyethoxy)ethyl]-acrylamide.

Unsaturated polyurethanes are also suitable for the implementation of the present invention, for example those derived from saturated or unsaturated diisocyanates and unsaturated or saturated diols. Polybutadiene and polyisoprene and copolymers thereof are also useful. Suitable comonomers include, for example, olefins, such as ethylene, propene, butene and hexene, (meth)acrylates, acrylonitrile, styrene and vinyl chloride.

Polymers having unsaturated (meth)acrylate groups in the side chain can be used as component a). They may tipically be reaction products of epoxy resins based on novolak with (meth)acrylic acid; homo- or co-polymers of vinyl alcohol or hydroxyalkyl derivatives thereof that have been esterified with (meth)acrylic acid; and homo- and co-polymers of (meth)acrylates that have been esterified with hydroxyalkyl (meth)acrylates.

Component c) in the mixture is a photosensitizer having a triplet energy of 225-310 kJ/mol.

Examples of photosensitizers are those commonly used in the art, aromatic carbonyl compounds, e.g. benzophenones, thioxanthones, anthraquinones and 3-acylcoumarin derivatives, terphenyls, styryl ketones, and 3-(aroylmethylene)-thiazolines, camphorquinones and also eosin, rhodamine and erythrosine dyes.

Examples of thioxanthones are thioxanthone, 2-isopropyl thioxanthone, 2-chloro thioxanthone, 2-dodecyl thioxanthone, 2,4-diethyl thioxanthone, 2,4-dimethyl thioxanthone, 1-methoxycarbonyl thioxanthone, 2-ethoxycarbonyl thioxanthone, 3-(2-methoxyethoxycarbonyl) thioxanthone, 4-butoxycarbonyl thioxanthone, 3-butoxycarbonyl-7-methyl thioxanthone, 1-cyano-3-chloro thioxanthone, 1-ethoxycarbonyl-3-chloro thioxanthone, 1-ethoxycarbonyl-3-ethoxy thioxanthone, 1-ethoxycarbonyl-3-amino thioxanthone, 1-ethoxycarbonyl-3-phenylsulfuryl thioxanthone, 3,4-di[2-(2-methoxyethoxy)ethoxycarbonyl] thioxanthone, 1-ethoxycarbonyl-3-(1-methyl-1-morpholinoethyl) thioxanthone, 2-methyl-6-dimethoxymethyl thioxanthone, 2-methyl-6-(1,1-dimethoxybenzyl) thioxanthone, 2-morpholinomethyl thioxanthone, 2-methyl-6-morpholinomethyl thioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxy thioxanthone, 6-ethoxycarbonyl-1-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propan-aminium chloride, or those described in the patent application PCT/EP2011/069514, such as n-dodecyl-7-methyl-thioxanthone-3-carboxylate and N,N-disobutyl-7-methyl-thioxanthone-3-carbamide. Also suitable are polymeric thioxanthone derivatives (e.g. Omnipol TX from IGM Resins B.V., Genopol TX-1 from Rahn A.G., Speedcure 7010 from Lambson Limited).

Example of benzophenones are benzophenone, 4-phenyl benzophenone, 4-methoxy benzophenone, 4,4'-dimethoxybenzophenone, 4,4'-dimethyl benzophenone, 4,4'-dichloro benzophenone, 4,4'-dimethylamino benzophenone, 4,4'-diethylamino benzophenone, 4-methyl benzophenone, 2,4,6-trimethyl benzophenone, 4-(4-methylthiophenyl) benzophenone, 3,3'-dimethyl-4-methoxy benzophenone, methyl 2-benzoyl benzoate, 4-(2-hydroxyethylthio) benzophenone, 4-(4-tolylthio) benzophenone, 4-benzoyl-N,N,N-trimethyl-benzene methanaminium chloride, 2-hydroxy-3-(4-benzoylphenoxy)-N,N,N-tri methyl-1-propanaminium chloride monohydrate, 4-(13-acryloyl-1,4,7,10,13-pentaoxatridecyl) benzophenone, 4-benzoyl-N,N-dimethyl-N-[2-(1-oxo-2-propenyl)oxylethyl-benzene methanaminium chloride. Also suitable are polymeric benzophenone derivatives (e.g. Omnipol® BP, Omnipol® 2702 and Omnipol® 682 all from IGM Resins B.V., Genopol® BP-2 from Rahn A.G. and Speedcure® 7005 from Lambson Limited).

Examples of 3-acylcoumarin derivatives are 3-benzoyl coumarin, 3-benzoyl-7-methoxy coumarin, 3-benzoyl-5,7-di(propoxy) coumarin, 3-benzoyl-6,8-dichloro coumarin, 3-benzoyl-6-chloro coumarin, 3,3'-carbonyl-bis[5,7-di (propoxy) coumarin], 3,3'-carbonyl-bis(7-methoxy coumarin), 3,3'-carbonyl-bis(7-diethylamino coumarin), 3-isobutyroyl coumarin, 3-benzoyl-5,7-dimethoxy coumarin, 3-benzoyl-5,7-diethoxy coumarin, 3-benzoyl-5,7-dibutoxy coumarin, 3-benzoyl-5,7-di(methoxyethoxy) coumarin, 3-benzoyl-5,7-di(allyloxy) coumarin, 3-benzoyl-7-dimethylamino coumarin, 3-benzoyl-7-diethylamino coumarin, 3-isobutyroyl-1,7-dimethylamino coumarin, 5,7-dimethoxy-3-(1-naphthoyl) coumarin, 5,7-dimethoxy-3(1-naphthoyl)-coumarin, 3-benzoylbenzo [f]coumarin, 7-diethylamino-3-thienoyl coumarin, 3-(4-cyanobenzoyl)-5,7-dimethoxy coumarin, or those described in EP2909243 and WO2017216699.

Examples of 3-(aroylmethylene) thiazolines are 3-methyl-1,2-benzoylmethylene-β-naphtho thiazoline, 3-methyl-2-benzoylmethylene-benzo thiazoline, 3-ethyl-2-propionylmethylene-β-naphtho thiazoline.

Examples of other aromatic carbonyl compounds are acetophenone, 3-methoxyacetophenone, 4-phenylacetophenone, benzil, such as that described in WO 2013/164394, 2-acetylnaphthalene, 2-naphthaldehyde, 9,10-anthraquinone, 9-fluorenone, dibenzosuberone, xanthone, 2,5-bis(4-diethylaminobenzylidene) cyclopentanone, α-(para-dimethylamino benzylidene); ketones, such as 2-(4-dimethylamino-benzylidene)-indan-1-one or 3-(4-dimethylaminophenyl)-1-indan-5-yl-propenone, 3-phenylthiophthalimide, N-methyl-3,5-di(ethylthio) phthalimide.

Particularly preferred are thioxanthones and 3-acylcoumarins.

We have surprisingly found that said component c) increases the activity of photoinitiators b) without shortening the shelf life of the mixtures. Moreover the mixtures have the special advantage that appropriate choice of the photosensitizer c) allows the spectral sensitivity of photoinitioator b) to beshifted into any desired wavelength regions.

The photocurable compositions of the present invention can also comprise further photoinitiators e) and/or additives f), in addition to components a), b) and c) or a) and d).

The further photoinitiators e) can be present in an amount comprised between 0.5 and 15% by weight, of the solids content (excluding water or solvent) preferably between 1 and 10% by weight of the composition. Examples of suitable other photoinitiators e) are camphorquinone, benzophenone, benzophenone derivatives, acetophenone, acetophenone derivatives, dialkoxyacetophenones, α-hydroxyketones, α-aminoketones, 4-aroyl-1,3-dioxolanes, benzoin alkyl ethers and benzil ketals, e.g. benzil dimethyl ketal, ketosulfones, e.g 1-[4-[(4-benzoyl-phenyl)-thio]-phenyl]-2-methyl-2-[(4-methyl-phenyl)-sulfonyl]-propan-1-one (Esacure® 1001, from IGM Resins B.V.), 3-ketocoumarins, for example as described in EP2909243 and WO2017216699, phenylglyoxylates and derivatives thereof, dimeric phenyl glyoxylates, peresters, e.g. benzophenonetetracarboxylic acid peresters, for example as described in EP 126 541, acylphosphine photoinitiators (which can be chosen among mono-acylphosphine oxides, bis-acylphosphine oxides, tris-acylphosphine oxides and multifunctional mono- or bisa-cylphosphine oxides), halomethyltriazines, hexaaryl bisimidazole/coinitiator systems, e.g. ortho-chloro-hexaphenylbisimidazole in combination with 2-mercapto-benzothiazole; ferrocenium compounds or titanocenes, for example dicyclopentadienyl-bis(2,6-difluoro-3-pyrrolophenyl)titanium; O-acyloxime ester photoinitiators.

Examples of α-hydroxyketones and α-aminoketones are 1-hydroxy cyclohexylphenyl ketone, 2-hydroxy-2-methyl-1-phenyl-propane-1-one, 1-[4-(2-hydroxyethoxy)phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one), 2-hydroxy-1-{4-[4-(2-hydroxy-2-methyl-propionyl)-phenoxy]-phenyl}-2-methyl-propan-1-one, 2-methyl-1-(4-methylthiophenyl)-2-morpholinopropane-1-one), 2-benzyl-2-dimethylamino-1-(4-morpholinophenyl)- butane-1-one, and (2-(dimethylamino)-2-[(4-methylphenyl) methyl]-1-[4-(4-morpholinyl) phenyl]-1-butanone).

Examples of O-acyloxime ester photoinitiators are 1,2-octanedione,1-[4-(phenylthio)phenyl]-2-(O-benzoyloxime), ethanone 1-[9-ethyl-6-(2-methylbenzoyl)-9H-carbazole-3-yl] 1-(O-acetyloxime) or those described in GB2339571.

Examples of acylphosphine photoinitiators include, but are not limited to, bis(2,4,6-trimethylbenzoyl)phenylphosphine oxide, bis(2,6-dimethoxybenzoyl)-2,4,4-trimethylpentyl phosphine oxide, bis(2,4,6-trimethylbenzoyl)-(2,4-dipentyloxyphenyl), 2,4,6-trimethylbenzoyl-diphenyl phosphine oxide and ethyl (2,4,6-trimethylbenzoyl) phenylphosphinate, phenyl(2,4,6-trimethylbenzoyl)phosphinic acid, glycerol ethoxylated trimester (Omnipol® TP from IGM Resins B.V.).

Examples of the halomethyltriazines based photoinitiators are 2-[2-(4-methoxy-phenyl)-vinyl]-4,6-bis-trichloromethyl [1,3,5]triazine, 2-(4-methoxy-phenyl)-4,6-bis-trichloromethyl [1,3,5]triazine, 2-(3,4-dimethoxyphenyl)-4,6-bis-trichloromethyl [1,3,5]triazine, 2-methyl-4,6-bis-trichloromethyl [1,3,5] triazine.

Cationic photoinitiators can be also used as the further photoinitiators e), when the photocurable compositions according to the invention are used in hybrid systems (which in this connection mean mixtures of free-radically and cationically curing systems). Examples of suitable cationic photoinitiators are aromatic sulfonium, phosphonium or iodonium salts, as described e.g. in U.S. Pat. No. 4,950,581, or cyclopentadienylarene-iron(II) complex salts, e.g. ($\eta^6$-isopropylbenzene)($\eta^5$-cyclopentadienyl) iron(II) hexafluorophosphate or photolatent acids based on oximes, as described, for example, in GB 2 348 644, U.S. Pat. Nos. 4,450,598, 4,136,055, WO 00/10972 and WO 00/26219.

Additives f) can be, for example, accelerators/co-initiators, thermal initiators, binders, stabilizers, and mixture thereof.

The photocurable composition of the invention can also conveniently include accelerators/co-initiators, e.g. alcohols, thiols, thioethers, amines or ethers that have an available hydrogen, bonded to a carbon adjacent to the heteroatom, disulfides and phosphines, as described e.g. in EP438123 and GB2180358. Such accelerators/co-initiators are generally present in an amount comprised between 0.2 and 15% by weight, preferably from 0.2 to 8% by weight.

Suitable examples of amine accelerators/co-initiators include, but are not limited to, aliphatic, cycloaliphatic, aromatic, aryl-aliphatic, heterocyclic, oligomeric or polymeric amines. They can be primary, secondary or tertiary amines, for example butyl amine, dibutyl amine, tributyl amine, cyclohexyl amine, benzyldimethyl amine, di-cyclohexyl amine, N-phenyl glycine, triethyl amine, phenyldiethanol amine, triethanolamine, piperidine, piperazine, morpholine, pyridine, quinoline, esters of dimethylamino benzoic acid, Michler's ketone (4,4'-bis-dimethyl aminobenzophenone) and corresponding derivatives.

As the amine accelerators/co-initiators, an amine-modified acrylate compound can be used: examples of such amine-modified acrylate include acrylates modified by reaction with a primary or secondary amine that are described in U.S. Pat. No. 3,844,916, EP 280222, U.S. Pat. Nos. 5,482,649 or 5,734,002. Multifunctional amine and polymeric amine derivatives are also suitable as co-initiators some examples are Omnipol® ASA from IGM Resins B.V., Genopol® AB-2 from Rahn A.G., Speedcure® 7040 from Lambson Limited or those described in US2013/0012611.

The curing process according to the invention, especially in the case of pigmented compositions, may also be assisted by the addition, as additional additive f), of a thermal initiator, a compound that forms free radicals when heated, e.g. an azo compounds, such as 2,2'-azobis(4-methoxy-2,4-dimethylvaleronitrile), a triazene, diazosulfide, pentazadiene or a peroxy compound, for example a hydroperoxide or peroxycarbonate, e.g. tert-butyl hydroperoxide, as described e.g. in EP245639.

Binders may also be added to the photocurable composition of the invention. The addition of binders is particularly advantageous when the photocurable compounds are liquid or viscous substances. The amount of binder may be, for example, from 5 to 60% by weight, preferably from 10 to 50% by weight. The choice of binder is made in accordance with the field of use and the properties required therefor, such as developability in aqueous and organic solvent systems, adhesion to substrates and sensitivity to oxygen.

Suitable binders are, for example, polymers having a molecular weight of approximately from 5000 to 2 000 000 Da, preferably from 10 000 to 1 000 000 Da. Illustrative examples are: homo- and co-polymers of acrylates and methacrylates, e.g. copolymers of methyl methacrylate/ethyl acrylate/methacrylic acid, poly(methacrylic acid alkyl esters), poly(acrylic acid alkyl esters); cellulose esters and ethers, such as cellulose acetate, cellulose acetate butyrate, methylcellulose, ethylcellulose; polyvinylbutyral, polyvinylformal, cyclised rubber, polyethers such as polyethylene oxide, polypropylene oxide, polytetrahydrofuran; polystyrene, polycarbonates, polyurethanes, chlorinated polyolefins, as e.g. polyvinyl chloride, co-polymers of vinyl chloride/vinylidene chloride, co-polymers of vinylidene chloride with acrylonitrile, methyl methacrylate and vinyl acetate, polyvinyl acetate, co-poly (ethylene/vinyl acetate), polymers such as polycaprolactam and poly(hexamethylene adipamide), polyesters such as poly(ethylene glycol terephthalate) and poly(hexamethylene glycol succinate).

Suitable stabilizers are, for example, thermal inhibitors, such as hydroquinone, hydroquinone derivatives, p-methoxyphenol, β-naphthol or sterically hindered phenols, e.g. 2,6-di(tert-butyl)-p-cresol, which prevent premature polymerization. In order to increase dark storage stability it is possible to use, for example, copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, e.g. tetramethylammonium chloride or trimethylbenzylammonium chloride, or hydroxylamine derivatives, e.g. N,N-diethylhydroxylamine. For the purpose of excluding atmospheric oxygen during polymerization it is possible to add paraffin or similar wax-like substances which, being insoluble in the polymer, migrate to the surface at the beginning of the polymerization and form a transparent surface layer which prevents air from entering.

It is also possible to add a light stabilizer, such as UV absorbers, e.g. hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS).

The photocurable compositions according to the invention may also comprise, as further additives f), photoreducible dyes, e.g. a xanthene, benzoxanthene, benzothioxanthene, thiazine, pyronin, porphyrin or acridine dye, and/or radiation cleavable trihalomethyl compounds. These compounds are described, for example, in EP445624.

Further customary additives f) are, depending upon the intended use, optical brighteners, fillers, pigments, both white and colored pigments, colorants, antistatics, wetting agents or flow improvers. Additives customary in the art, e.g, antistatics, flow improvers and adhesion enhancers, can also be used.

It is also possible for chain-transfer reagents customary in the art to be added to the compositions according to the invention, Examples are mercaptans, amines and benzothiazole.

The composition of the invention may also comprise colorants and/or colored pigments. Depending upon the intended use, both inorganic and organic pigments may be used. Such additives will be known to the person skilled in the art; some examples are carbon black, iron oxides, such as iron oxide yellow, iron oxide red, chromium yellow, chromium green, nickel titanium yellow, ultramarine blue, cobalt blue, bismuth vanadate, cadmium yellow and cadmium red. Examples of organic pigments are mono- or bis-azo pigments, and also metal complexes thereof, phthalocyanine pigments, polycyclic pigments, e.g. perylene, anthraquinone, thioindigo, quinacridone or triphenylmethane pigments, and also diketo-pyrrolo-pyrrole, isoindolinone, e.g. tetrachloroisoindolinone, isoindoline, dioxazine, benzimidazolone and quinophthalone pigments. The pigments may be used in the formulations on their own or in admixture.

Depending upon the intended use, the pigments can be added to the formulations in amounts customary in the art, for example in an amount from 0.1 to 30% by weight or from 10 to 25% by weight, based on the total mass.

The composition may also comprise, for example, organic colorants of an extremely wide variety of classes. Examples are azo dyes, methine dyes, anthraquinone dyes and metal complex dyes. Usual concentrations are, for example, from 0.1 to 20% wt, especially from 1 to 5% wt, based on the total mass.

The choice of additives is governed by the field of use in question and the properties desired for that field. The additives d) described above are known in the art and are accordingly used in the amounts customary in the art.

The photocurable compositions of the invention are suitable for various purposes, for example as a printing ink, such as screen printing inks, flexographic printing inks, offset printing inks and inkjet printing inks, as clearcoats, as colored coats, for example for wood or metal, as powder coatings, as coating materials inter alia for paper, wood, metal or plastics, as daylight-curable paints for marking structures and roads, for photographic reproduction processes, for holographic recording materials, for image-recording processes or in the production of printing plates that can be developed using organic solvents or using aqueous-alkaline media, for the production of masks for screen printing, as dental filling compounds, as adhesives, as pressure-sensitive adhesives, as laminating resins, as photoresists, e.g. galvanoresists, as etch resists or permanent resists, both liquid and dry films, as photostructurable dielectrics, and as solder masks for electronic circuits, as resists in the production of color filters for any type of display screen or in the creation of structures during the manufacture of plasma displays and electroluminescent displays, in the production of optical switches, optical gratings (interference gratings), in the manufacture of three-dimensional articles by bulk curing (UV curing in transparent moulds) or according to the stereolithography process, as described, for example, in U.S. Pat. No. 4,575,330, in the manufacture of composite materials (e.g. styrene polyesters which may include glass fibers and/or other fibers and other adjuvants) and other methods of printing in three dimensions well-known to one skilled in the art, in the coating or sealing of electronic components or as coatings for optical fibers.

The photocurable compositions of the invention are also suitable for the production of optical lenses, e.g. contact lenses or Fresnel lenses, in the manufacture of medical apparatus, aids or implants, in dry film paints. The photocurable compositions of the invention are also suitable for the preparation of gels having thermotropic properties. Such gels are described e.g. in DE 19700064 and EP 678534.

The compounds and compositions according to the invention may also be used as free-radical photoinitiators or photoinitiating systems for radiation-curable powder coatings.

The photocurable compositions according to the invention are suitable, for example, as coating materials for all kinds of substrate, for example wood, textiles, paper, ceramics, glass, plastics, such as polyesters, polyethylene terephthalate, polyolefins and cellulose acetate, especially in the form of films, and also metals, such as Al, Cu, Ni, Fe, Zn, Mg or Co and GaAs, Si or $SiO_2$, to which a protective layer is to be applied or an image is to be applied e.g, by imagewise exposure.

A photocurable compositions comprising at last a compound of formula (Ia), and/or (II) represents a further subject-matter of the invention. According to another of its aspects, it is a further subject-matter of the invention a process for photocuring photopolymerizable compositions and inks, which process comprises:

I) preparing a photopolymerizable composition comprising:
   a), b) and c), as defined above; or
   a) and d), as defined above;
II) coating or printing said photopolymerizable composition onto a substrate, and
III) photopolymerizing said coated or printed composition with a light source on said substrate.

Accordingly, a large number of the most varied kinds of light source may be used, the light source emits at wavelengths from approximately 200 nm to approximately 600 nm. Both point sources and planiform radiators (lamp carpets) are suitable. Examples are: carbon arc lamps, xenon arc lamps, medium pressure, high pressure and low pressure mercury arc radiators, doped, where appropriate, with metal halides (metal halide lamps), microwave-excited metal vapour lamps, excimer lamps, superactinic fluorescent tubes, fluorescent lamps, argon incandescent lamps, flash lamps, photographic floodlight lamps, light-emitting diodes (LED), electron beams, X-rays and lasers. The distance between the lamp and the substrate according to the invention to be exposed may vary according to the intended use and the type and strength of the lamp and may be, for example, from 1 cm to 150 cm.

Particularly preferred are LED light source emitting at wavelengths comprised between 365 nm and 420 nm, preferably 365 nm, 385 nm and 395 nm.

Said photopolymerizable composition may also be applied over a substrate already comprising a coated or printed layer. Said photopolymerizable composition may, after photopolymerization with said light source, be overprinted or overcoated with one or more compositions suitable for printing or coating.

Any article of manufacture comprising at last a compound of formula (Ia), and/or (II) represents a further subject-matter of the invention.

The article of manufacture obtained by applying said photopolymerizable composition to said substrate by said means of coating or printing, and photopolymerizing by said light source, with or without further elaboration of the article by further coating or printing, is a further subject-matter of this invention.

Surprisingly, we found that compounds of formula (Ia) and (II), compared to the compound described in Macromolecules 2009, 42, 6031-6037 (PI-1), show higher reactivity during the photopolymerization process both in clear and pigmented system. Moreover we demonstrated for the first time that compounds of formula (I) and (II) can be synthesized, improving the spectral activity of these compounds.

For instance, we found that compound of formula (Ia) described in the Example 5 is twice reactive than the reference compound described in Macromolecules 2009, 42, 6031-6037 (PI-1), when used in the same amount, moreover this compound can be synthesized by isopropylthioxanthone working in this way at LED wavelength (e.g. 400 nm).

Representative preparation of α-disilyloxyketones of formula (Ia) and (II) and photocurable compositions according to the invention, only for illustrative and not limitative purpose, are reported in the following examples.

EXAMPLES

Definitions and Apparatus $^1$H NMR spectra were recorded with a Bruker Avance 400 MHz or a Bruker DMX 500 MHz or a Bruker DMX 600 MHz.

Infrared spectra were recorded with a FT-IR 430-Jasco.

In the following Examples, in case of inconsistency between the chamical structure and the chemical name indicated, chamical structure prevails.

Example 1

Synthesis of 1-(4-methoxyphenyl)-2-methyl-2-((1,1,2,2,2-pentamethyldisilanyl)oxy)propan-1-one

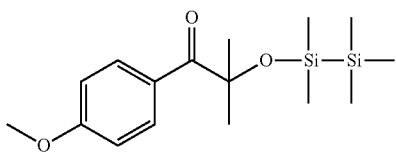

To a solution of 5 g (46.2 mmol) of anisole and 11.16 g (48.5 mmol) of alpha-bromoisobutirylbromide in 70 ml of dichloromethane in about 30' 6.46 g (48.5 mmol) of aluminum trichloride were added, maintaining the temperature between 0° and 5° C. After 2 h at room temperature the reaction mixture was poured in a mixture of 100 ml of water and ice and 2 ml of 37% HCl. The organic phase was separated and washed with water, dried on sodium sulphate, and filtered. The solution was treated at reflux for 3 h with 120 ml of a solution 0.5 M of KOH in methanol. After dilution with 100 ml of water and 50 ml of dichloromethane, the phases were separated. The organic phase was washed with water, dried on sodium sulphate, filtered off and the solvent was evaporated under vacuum. The crude material was used without any purification in the next step.

2-hydroxy-1-(4-methoxyphenyl)-2-methylpropan-1-one (2 g, 10.2 mmol) and chloropentamethyldisilane (1.7 g, 10.2 mmol) were dissolved in 10 ml of dichloromethane and 0.69 g (10.2 mmol) of imidazole were added. The reaction mixture was stirred at room temperature for 3 h and then evaporated under vacuum. The crude material was diluted in 20 ml of toluene and filtered on silica gel. The solvent was removed under vacuum to give the pure product. (1.9 g)

$^1$H NMR (CDCl$_3$, δ ppm): 0.00 (s, 9H), 0.13 (s, 6H), 1.55 (s, 6H), 3.85 (s, 3H), 6.88 (d, 2H), 8.22 (d, 2H).

Example 2

Synthesis of 2-methyl-1-(4-(methylthio)phenyl)-2-((1,1,2,2,2-pentamethyldisilanyl)oxy)propan-1-one

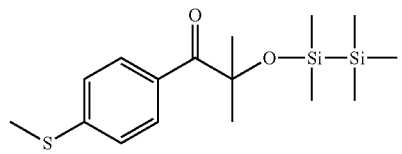

To a solution of 5 g (40.2 mmol) of thioanisole and 9.72 g (42.2 mmol) of alpha-bromoisobutirylbromide in 70 ml of dichloromethane in about 30' 5.62 g (42.2 mmol) of aluminum trichloride were added, maintaining the temperature between 0° and 5° C. After 2 h at room temperature the reaction mixture was poured in a mixture of 100 ml of water and ice and 2 ml of 37% HCl. The organic phase was separated and washed with water, dried on sodium sulphate, and filtered. The solution was treated at reflux for 3 h with 100 ml of a solution 0.5 M of KOH in methanol. After dilution with 100 ml of water and 50 ml of dichloromethane, the phases were separated. The organic phase was washed with water, dried on sodium sulphate, filtered off and the solvent was evaporated under vacuum. The crude material was used without any purification in the next step. 2-hydroxy-2-methyl-1-(4-(methylthio)phenyl)propan-1-one (1.4 g, 6.6 mmol) and chloropentamethyldisilane (1.1 g, 6.6 mmol) were dissolved in ml of dichloromethane and 0.44 g (6.6 mmol) of imidazole were added. The reaction mixture was stirred at room temperature for 3 h and then evaporated under vacuum. The crude material was diluted in 20 ml of toluene and filtered on silica gel. The solvent was removed under vacuum to give the pure product (1.35 g).

$^1$H NMR (CDCl$_3$, δ ppm): 0.00 (s, 9H), 0.14 (s, 6H), 1.53 (s, 6H), 2.50 (s, 3H), 7.2 (d, 2H), 8.14 (d, 2H).

Example 3

Synthesis of 2-methyl-1-(4-morpholinophenyl)-2-((1,1,2,2,2-pentamethyldisilanyl)oxy)propan-1-one

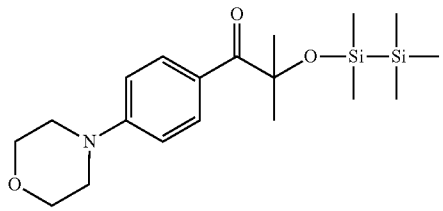 [SMILES: CC(C)(O[Si](C)(C)[Si](C)(C)C)C(=O)c1ccc(N2CCOCC2)cc1]

To a solution of 10 g (104 mmol) of fluorobenzene and 25.1 g (109 mmol) of alpha-bromoisobutirylbromide in 120 ml of dichloromethane in about 30' 14.5 g (109 mmol) of aluminum trichloride were added, maintaining the temperature between 0° and 5° C. After 2 h at room temperature the reaction mixture was poured in a mixture of 100 ml of water and ice and 2 ml of 37% HCl. The organic phase was separated and washed with water, dried on sodium sulphate, and filtered. The solution was treated at reflux for 3 h with 100 ml of a solution 0.5 M of KOH in methanol. After dilution with 100 ml of water and 50 ml of dichloromethane, the phases were separated. The organic phase was washed with water, dried on sodium sulphate, filtered off and the solvent was evaporated under vacuum. The crude material (4 g, 21.3 mmol), morpholine (1.85 g, 21.3 mmol) and potassium carbonate (4.42 g, 32 mmol) were dissolved in 50 ml of dimethyl sulfoxide. After 18 h at 160° C., the suspension was cooled down, diluted with water and extracted with dichloromethane. The organic phase was washed with water, dried on sodium sulphate, filtered off and the solvent was evaporated under vacuum. The crude material was used without any purification in the next step.

2-hydroxy-2-methyl-1-(4-morpholinophenyl)propan-1-one (1.67 g, 6.69 mmol) and chloropentamethyldisilane (1.11 g, 6.69 mmol) were dissolved in 30 ml of dichloromethane and 0.45 g (6.69 mmol) of imidazole were added. The reaction mixture was stirred at room temperature for 3 h and then evaporated under vacuum. The crude material was purified by flash column chromathography (dichloromethane/ethyl acetate 9:1) obtaining 1.15 g of the pure product.

$^1$H NMR (CDCl$_3$, δ ppm): 0.01 (s, 9H), 0.14 (s, 6H), 1.50 (s, 6H), 3.29 (t, 2H), 3.86 (t, 2H), 6.83 (d, 2H), 8.19 (d, 2H).

Example 4

Synthesis of 2-methyl-2-((1,1,2,2,2-pentamethyldisilanyl)oxy)-1-(4-phenoxyphenyl)propan-1-one

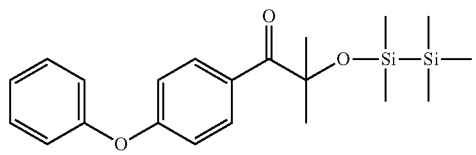 [SMILES: CC(C)(O[Si](C)(C)[Si](C)(C)C)C(=O)c1ccc(Oc2ccccc2)cc1]

To a solution of 15 g (88.1 mmol) of diphenylether and 10.11 g (44 mmol) of alpha-bromoisobutirylbromide in 100 ml of dichloromethane in about 30' 5.87 g (44 mmol) of aluminum trichloride were added, maintaining the temperature between 0° and 5° C., After 2 h at room temperature the reaction mixture was poured in a mixture of 100 ml of water and ice and 2 ml of 37% HCl. The organic phase was separated and washed with water, dried on sodium sulphate, and filtered. The solution was treated at reflux for 3 h with 120 ml of a solution 0.5 M of KOH in methanol. After dilution with 100 ml of water and 50 ml of dichloromethane, the phases were separated. The organic phase was washed with water, dried on sodium sulphate, filtered off and the solvent was evaporated under vacuum. The crude material was purified by flash column chromathography (dichloromethane) and used in the next step.

2-hydroxy-2-methyl-1-(4-phenoxyphenyl)propan-1-one (1.5 g, 5.8 mmol) and chloropentamethyldisilane (0.97 g, 5.8 mmol) were dissolved in 20 ml of dichloromethane and 0.4 g (5.8 mmol) of imidazole were added. The reaction mixture was stirred at room temperature for 3 h and then evaporated under vacuum. The crude material was diluted in 20 ml of toluene and filtered on silica gel. The solvent was removed under vacuum to give the pure product. (1.27 g)

$^1$H NMR (CDCl$_3$, δ ppm): 0.05 (s, 9H), 0.15 (s, 6H), 1.55 (s, 6H), 6.95 (d, 2H), 7.07 (d, 2H), 7.18 (t, 1H), 7.38 (t, 2H), 8.20 (d, 2H).

Example 5

Synthesis of 2-methyl-2-((1,1,2,2,2-pentamethyldisilanyl)oxy)-1-(4-(phenylthio)phenyl)propan-1-one

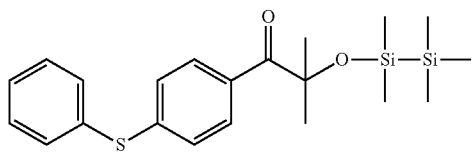 [SMILES: CC(C)(O[Si](C)(C)[Si](C)(C)C)C(=O)c1ccc(Sc2ccccc2)cc1]

To a solution of 15 g (80.5 mmol) of diphenyl sulfide and 9.25 g (40.2 mmol) of alpha-bromoisobutirylbromide in 100 ml of dichloromethane in about 30' 5.35 g (40.2 mmol) of aluminum trichloride were added, maintaining the temperature between 0° and 5° C. After 2 h at room temperature the reaction mixture was poured in a mixture of 100 ml of water and ice and 2 ml of 37% HCl. The organic phase was separated and washed with water, dried on sodium sulphate, and filtered. The solution was treated at reflux for 3 h with 100 ml of a solution 0.5 M of KOH in methanol. After dilution with 100 ml of water and 50 ml of dichloromethane, the phases were separated. The organic phase was washed with water, dried on sodium sulphate, filtered off and the solvent was evaporated under vacuum. The crude material was purified by flash column chromathography (dichloromethane) and used in the next step.

2-hydroxy-2-methyl-1-(4-(phenylthio)phenyl)propan-1-one (1.5 g, 5.5 mmol) and chloropentamethyldisilane (0.92 g, 5.5 mmol) were dissolved in 20 ml of dichloromethane and 0.37 g (5.5 mmol) of imidazole were added. The reaction mixture was stirred at room temperature for 3 h and then evaporated under vacuum. The crude material was diluted in 20 ml of toluene and filtered on silica gel. The solvent was removed under vacuum to give the pure product (1.30 g).

$^1$H NMR (CDCl$_3$, δ ppm): 0.00 (m, 9H), 0.14 (m, 6H), 1.54 (s, 6H), 7.18 (d, 2H), 7.37 (m, 3H), 7.47 (d, 2H), 8.08 (d, 2H).

Examples 6

Synthesis of 2-methyl-2-((1,1,2,2,2-pentamethyldisilanyl)oxy)-3,4-dihydronaphthalen-1(2H)-one

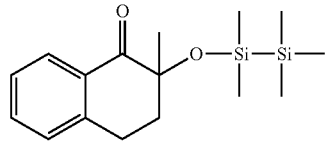 [SMILES: CC1(O[Si](C)(C)[Si](C)(C)C)CCc2ccccc2C1=O]

Step 1. A solution of 1-tetralone (4.55 mL, 34.202 mmol) in 20 mL of THF was added dropwise to a stirred suspension of NaH (60% dispersion in oil, 2.73 g, 68.404 mmol) and dimethyl carbonate (5.76 mL, 68,404 mmol) in THF (80 mL) under nitrogen atmosphere. The reaction was heated to reflux for two hours. Then it was allowed to cool down to room temperature, acidified with an aqueous solution of hydrochloric acid 1M and extracted with ethyl acetate (2×50 mL). The organic layer was washed with an aqueous solution of NaHCO$_3$ 10%, brine, dried over sodium sulfate and the solvent was removed under reduced pressure. The residue was dissolved in DMF (20 mL) and added dropwise to a stirred suspension of NaH (60% dispersion in oil, 2.05 g, 51.3 mmol) in DMF (50 mL). The mixture was stirred at room temperature for an hour under nitrogen atmosphere. Then methyl iodide (3.19 mL, 51.3 mmol) was added and the mixture was stirred at the same temperature for another hour. Then water was added and the mixture was extracted with ethyl acetate (2×50 mL). The organic layer was washed with brine, dried over sodium sulfate and the solvent was removed under reduced pressure. The residue was dissolved in acetic acid (50 mL) and HCl 37% (11 mL) was added. Mixture was heated to reflux for four hours, cooled to room temperature, diluted with water (100 mL) and extracted with dichloromethane (2×50 mL). The organic layer was washed with brine, dried over sodium sulfate and the solvent removed under reduced pressure. The crude material was purified by flash column chromatography (ethyl acetate/petroleum ether=5/95) to obtain 5.056 g of pure product.

$^1$H NMR (CDCl$_3$, δ ppm): 1.24-1.30 (d, 3H), 1.84-1.92 (m, 1H), 2.16-2.23 (m, 1H), 2.55-2.62 (m, 1H), 2.94-3.07 (m, 2H), 7.21 (d, 1H), 7.27-7.32 (t, 1H), 7.43-7.48 (m, 1H), 8.01-8.06 (m, 1H).

Step 2. To a suspension of NaI (3.567 g, 23.84 mmol) in acetonitrile (50 mL) a solution of 2-methyl-3,4-dihydronaphthalen-1(2H)-one (2.728 g, 17.03 mmol, prepared in Step 1) in acetonitrile (10 mL) was added followed by triethylamine (3.55 mL 25.54 mmol). Then the mixture was cooled to 0° C. and chlorotrimethylsilane (2.81 mL, 22.14 mmol) was added dropwise. Mixture was stirred under nitrogen at room temperature for two hours. Then water (50 mL) was added and mixture was extracted with ethyl acetate (2×50 mL). The organic layer was washed with brine, dried over sodium sulfate and the solvent was removed under reduced pressure. The residue was dissolved in dichloromethane (20 mL) and 3-chloroperbenzoic acid (3.82 g, 22.13 mmol) was added at 0° C. Mixture was stirred at room temperature for 30 minutes. Then it was washed with an aqueous solution of NaHCO$_3$ 10%, brine, dried over sodium sulfate and the solvent was removed under reduced pressure. The residue was dissolved in THF (40 mL) and tetra-n-butylammonium floride (6.68 g, 25.54 mmol) was added. The reaction was stirred overnight at room temperature. Then water (50 mL) was added and mixture was extracted with ethyl acetate (2×50 mL), The organic layer was washed with an aqueous solution of NaHCO$_3$ 10%, brine, dried over sodium sulfate and the solvent was removed under reduced pressure. The crude was purified by flash column chromatography (ethyl acetate/petroleum ether=1/5) to obtain 2.177 g of pure product.

$^1$H NMR (CDCl$_3$, δ ppm): 1.4 (s, 3H), 2.17-2.28 (m, 2H), 2.99-3.14 (m, 2H), 7.23-7.28 (m, 1H), 7.32-7.37 (t, 1H), 7.49-7.55 (m, 1H), 8.01-8.06 (m, 1H).

Step 3. To a solution of 2-hydroxy-2-methyl-3,4-dihydronaphthalen-1(2H)-one (300 mg, 1.704 mmol, prepared in Step 2) in dichloromethane (10 mL), chloropentamethyldisilane (494 μL, 2.56 mmol) and imidazole (174 mg, 2.56 mmol) were added. Mixture was stirred at room temperature for three hours and then concentrated under reduced pressure. The residue was filtered through a short pad of silica gel (ciclohexane 100% 2 cv and then eluted with ethyl acetate/ciclohexane 5/95) to obtain 90 mg of pure product.

$^1$H NMR (500 MHz, CDCl$_3$): 0.09 (s, 9H), 0.18 (s, 3H), 0.20 (s, 3H), 1.41 (s, 3H), 2.01-2.08 (m, 1H), 2.19-2.26 (m, 1H), 2.84-2.91 (m, 1H), 3.10-3.17 (m, 1H), 7.18-7.22 (d, 1H), 7.27-7.32 (t, 1H), 7.43-7.47 (m, 1H), 7.99-8.02 (m, 1H).

Example 7

Synthesis of 6-methoxy-2-methyl-2-[(1,1,2,2,2-pentamethyldisilan-1-yl)oxy]-1,2,3,4-tetrahydronaphthalen-1-one

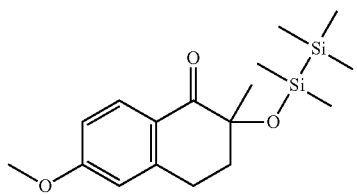

Step 1. A solution of 6-methoxy-1-tetralone (5 g, 28.37 mmol) in 50 mL of THF was added dropwise to a stirred suspension of NaH (60% dispersion in oil, 2.27 g, 56.75 mmol) and dimethyl carbonate (4.78 mL, 56.75 mmol) in THF (50 mL) under nitrogen atmosphere. The reaction was heated to reflux for two hours. Then it was allowed to cool down to room temperature, acidified with an aqueous solution of hydrochloric acid 1M and extracted with ethyl acetate (2×50 mL). The organic layer was washed with an aqueous solution of NaHCO$_3$ 10%, brine, dried over sodium sulfate and the solvent was removed under reduced pressure. The residue was dissolved in DMF (20 mL) and added dropwise to a stirred suspension of NaH (60% dispersion in oil, 1.7 g, 42.55 mmol) in DMF (50 mL). The mixture was stirred at room temperature for an hour under nitrogen atmosphere. Then methyl iodide (2.6 mL, 42.55 mmol) was added and the mixture was stirred at the same temperature for another hour. Then water was added and the mixture was extracted with ethyl acetate (2×50 mL), The organic layer was washed with brine, dried over sodium sulfate and the solvent was removed under reduced pressure. The residue was dissolved in acetic acid (50 mL) and HCl 37% (11 mL) was added. Mixture was heated to reflux for four hours, cooled to room temperature, diluted with water (100 mL) and extracted with dichloromethane (2×50 mL). The organic layer was washed with brine, dried over sodium sulfate and the solvent removed under reduced pressure. The crude was purified by flash chromatography (ethyl acetate/petroleum ether=1/9) to obtain 5.04 g of pure product (yield=93%).

$^1$H NMR (500 MHz, CDCl$_3$): δ=1.22-1.27 (d, 3H), 1.80-1.89 (m, 1H), 2.13-2.19 (m, 1H), 2.49-2.56 (m, 1H), 2.88-3.02 (m, 2H), 3.83 (s, 3H), 6.65-6.67 (m, 1H), 6.79-6.82 (m, 1H), 7.98-8.01 (m, 1H).

Step 2. To a suspension of NaI (2.62 g, 17.47 mmol) in acetonitrile (25 mL) a solution of 6-methoxy-2-methyl-1,2,3,4-tetrahydronaphthalen-1-one (prepared in step 1) (2 g, 12.48 mmol) in acetonitrile (10 mL) was added followed by triethylamine (2.6 mL 18.72 mmol). Then the mixture was cooled to 0° C. and chlorotrimethylsilane (2.06 mL, 16.22 mmol) was added dropwise. Mixture was stirred under nitrogen at room temperature for two hours. Then water (25 mL) was added and mixture was extracted with ethyl acetate (2×25 mL). The organic layer was washed with brine, dried over sodium sulfate and the solvent was removed under reduced pressure. The residue was dissolved in dichloromethane (10 mL) and 3-chloroperbenzoic acid (3.635 g, 21.06 mmol) was added at 0° C. Mixture was stirred at room temperature for 30 minutes. Then it was washed with an aqueous solution of NaHCO₃ 10%, brine, dried over sodium sulfate and the solvent was removed under reduced pressure. The residue was dissolved in THF (40 mL) and tetra-n-butylammonium fluoride (3.94 g, 12.48 mmol) was added. The reaction was stirred overnight at room temperature. Then water (50 mL) was added and mixture was extracted with ethyl acetate (2×50 mL). The organic layer was washed with an aqueous solution of NaHCO₃ 10%, brine, dried over sodium sulfate and the solvent was removed under reduced pressure. The crude was purified by flash chromatography (ethyl acetate/petroleum ether=3/7) to obtain 557 mg of pure product (yield=22%).

$^1$H NMR (500 MHz, CDCl₃): δ=1.4 (s, 3H), 2.15-2.26 (m, 2H), 2.92-3.1 (m, 2H), 3.85 (s, 3H), 6.72 (s, 1H), 6.84-6.88 (m, 1H), 7.97-8.01 (m, 1H).

Step 3. To a solution of 2-hydroxy-6-methoxy-2-methyl-1,2,3,4-tetrahydronaphthalen-1-one (prepared in step 2) (270 g, 1.31 mmol) in dichloromethane (2 mL), chloropentamethyldisilane (303 μL, 1.57 mmol) and imidazole (107 mg, 1.57 mmol) were added. Mixture was stirred at room temperature for three hours and then concentrated under reduced pressure. The residue was filtered through a short pad of aluminium oxide (petroleum ether 2 cv; ethyl acetate/petroleum ether 5/95) to obtain 150 mg of pure product (yield=34%).

$^1$H NMR (300 MHz, DMSO-d6): −0.01 (s, 9H), 0.15 (s, 3H), 0.13 (s, 3H), 1.32 (s, 3H), 1.96-2.15 (m, 2H), 2.82-2.96 (m, 1H), 2.97-3.10 (m, 1H), 3.83 (s, 3H), 6.83-6.87 (d, 1H), 6.88-6.95 (dd, 1H), 7.81-7.88 (d, 1H).

Example 8

Synthesis of 2-methyl-1-[4-(4-{2-methyl-2-[(1,1,2,2,2 pentamethyldisilan-1-yl)oxy]propanoyl}phenoxy)phenyl]-2-[(1,1,2,2,2-pentamethyldisilan-1-yl)oxy]propan-1-one (Formula (I)/(Ia), n=2, Ar(Ar')=-phenylene-O-phenylene-)

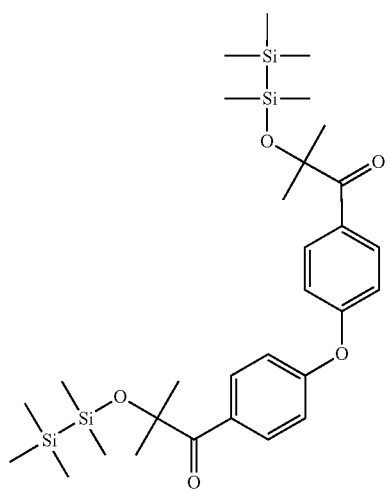 [SMILES: CC(C)(O[Si](C)(C)[Si](C)(C)C)C(=O)c1ccc(Oc2ccc(C(=O)C(C)(C)O[Si](C)(C)[Si](C)(C)C)cc2)cc1]

2-hydroxy-1-{4-[4-(2-hydroxy-2-methylpropanoyl)phenoxy]phenyl}-2-methylpropan-1-one (2 g, 5.841 mmol) was dissolved in dichloromethane (10 mL), chloropentamethyldisilane (2.71 mL, 14.02 mmol) and imidazole (954 mg, 14.02 mmol) were added. Mixture was stirred at room temperature for two hours and then concentrated under reduced pressure. Crude was purified by flash chromatography (petroleum ether 2 cv; ethyl acetate/petroleum ether 5/95) to obtain 2.4 g of pure product (yield=69%).

$^1$H NMR (300 MHz, DMSO-d6): −0.03 (s, 18H), 0.15 (s, 12H), 1.5 (s, 12H), 7.10-7.18 (d, 4H), 8.13-8.20 (d, 4H).

Example 9

Synthesis of 1-[(1-benzoylcyclohexyl)oxy]-1,1,2,2,2-pentamethyldisilane

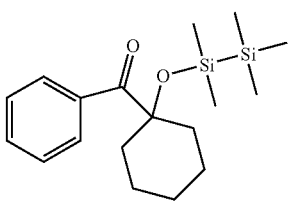 [SMILES: C[Si](C)(C)[Si](C)(C)OC1(C(=O)c2ccccc2)CCCCC1]

1-benzoylcyclohexan-1-ol (1 g, 4.89 mmol) was dissolved in dichloromethane (10 mL), chloropentamethyldisilane (1.14 mL, 5.87 mmol) and imidazole (400 mg, 5.87 mmol) were added. Mixture was stirred at room temperature for two hours and then concentrated under reduced pressure. Crude was purified by flash chromatography on aluminium oxide (petroleum ether 2 cv; ethyl acetate/petroleum ether 3/97) to obtain 350 mg of pure product (yield=21%).

$^1$H NMR (300 MHz, DMSO-d6): 0.00 (s, 9H), 0.08 (s, 6H), 1.21-1.54 (m, 4H), 1.55-1.71 (m, 2H), 1.71-1.83 (m, 2H), 1.86-2.00 (m, 2H), 7.44-7.54 (m, 2H), 7.54-7.64 (m, 1H), 8.02-8.11 (m, 2H).

Example 10

Synthesis of 6-methyl-6-[(1,1,2,2,2-pentamethyldisilan-1-yl)oxy]-6,7,8,9-tetrahydro-5H-benzo[7]annulen-5-one

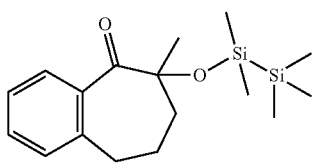 [SMILES: CC1(O[Si](C)(C)[Si](C)(C)C)CCCc2ccccc2C1=O]

Step 1. A solution of 1-Benzosuberone (5 g, 31.21 mmol) in 50 mL of THF was added dropwise to a stirred suspension of NaH (60% dispersion in oil, 2.50 g, 62.42 mmol) and dimethyl carbonate (5.26 mL, 62.42 mmol) in THF (50 mL) under nitrogen atmosphere. The reaction was heated to reflux S for two hours. Then it was allowed to cool down to room temperature, acidified with an aqueous solution of hydrochloric acid 1M and extracted with ethyl acetate (2×50 mL). The organic layer was washed with an aqueous solution of NaHCO₃ 10%, brine, dried over sodium sulfate and the solvent was removed under reduced pressure. The residue was dissolved in DMF (20 mL) and added dropwise to a stirred suspension of NaH (60% dispersion in oil, 1.87 g, 46.8 mmol) in DMF (50 mL). The mixture was stirred at room temperature for an hour under nitrogen atmosphere. Then methyl iodide (2.91 mL, 46.8 mmol) was added and the mixture was stirred at the same temperature for another hour. Then water was added and the mixture was extracted with ethyl acetate (2×50 mL). The organic layer was washed with brine, dried over sodium sulfate and the solvent was removed under reduced pressure. The residue was dissolved in acetic acid (50 mL) and HCl 37% (11 mL) was added. Mixture was heated to reflux for four hours, cooled to room temperature, diluted with water (100 mL) and extracted with dichloromethane (2×50 mL). The organic layer was washed with brine, dried over sodium sulfate and the solvent removed under reduced pressure. The crude was purified by flash chromatography (ethyl acetate/petroleum ether=5/95) to obtain 4.97 g of pure product (yield=91%).

$^1$H NMR (500 MHz, CDCl$_3$): δ=1.19-1.24 (d, 3H), 1.54-1.64 (m, 1H), 1.66-1.74 (m, 1H), 1.86-1.95 (m, 1H), 2.02-2.12 (m, 1H), 2.87-3.04 (m, 3H), 7.18-7.21 (d, 1H), 7.25-7.29 (d, 1H), 7.34-7.39 (m, 1H), 7.64-7.68 (m, 1H).

Step 2. To a suspension of NaI (5.98 g, 39.93 mmol) in acetonitrile (50 mL) a solution of 6-methyl-6,7,8,9-tetrahydro-5H-benzo[7]annulen-5-one (prepared in step 1) (4.97 g, 28.52 mmol) in acetonitrile (10 mL) was added followed by triethylamine (5.95 mL 42.78 mmol). Then the mixture was cooled to 0° C. and chlorotrimethylsilane (4.71 mL, 37.08 mmol) was added dropwise. Mixture was stirred under nitrogen at room temperature for two hours. Then water (50 mL) was added and mixture was extracted with ethyl acetate (2×50 mL). The organic layer was washed with brine, dried over sodium sulfate and the solvent was removed under reduced pressure. The residue was dissolved in dichloromethane (20 mL) and 3-chloroperbenzoic acid (8.31 g, 48.15 mmol) was added at 0° C. Mixture was stirred at room temperature for 30 minutes. Then it was washed with an aqueous solution of NaHCO$_3$ 10%, brine, dried over sodium sulfate and the solvent was removed under reduced pressure. The residue was dissolved in THF (40 mL) and tetra-n-butylammonium fluoride (7.46 g, 28.52 mmol) was added. The reaction was stirred overnight at room temperature. Then water (50 mL) was added and mixture was extracted with ethyl acetate (2×50 mL). The organic layer was washed with an aqueous solution of NaHCO$_3$ 10%, brine, dried over sodium sulfate and the solvent was removed under reduced pressure. The crude was purified by flash chromatography (ethyl acetate/petroleum ether=1/9) to obtain 3.654 g of pure product (yield=67%).

$^1$H NMR (500 MHz, CDCl$_3$): δ=1.25 (s, 3H), 1.88-2.05 (m, 3H), 2.11-2.18 (m, 1H), 2.83-2.88 (m, 2H), 7.14-7.17 (m, 1H), 7.24-7.28 (m, 1H), 7.35-7.39 (m, 2H).

Step 3. To a solution of 6-hydroxy-6-methyl-6,7,8,9-tetrahydro-5H-benzo[7]annulen-5-one (prepared in step 2) (1 g, 5.26 mmol) in dichloromethane (50 mL), chloropentamethyldisilane (1.22 mL, 6.31 mmol) and imidazole (429 mg, 6.31 mmol) were added. Mixture was stirred at room temperature for three hours and then concentrated under reduced pressure. The residue was filtered through a short pad of aluminium oxide (petroleum ether 4 cv) to obtain 506 mg of pure product (yield=30%).

$^1$H NMR (300 MHz, DMSO-d6): −0.10 (s, 9H), 0.05 (s, 3H), 0.16 (s, 3H), 1.36 (s, 3H), 1.59-1.75 (m, 1H), 1.76-1.87 (m, 1H), 1.87-2.06 (m, 2H), 2.69-2.81 (m, 1H), 2.86-2.99 (m, 1H), 7.17-7.24 (m, 1H), 7.24-7.30 (m, 2H), 7.32-7.41 (m, 1H).

Example 11

Synthesis of a Mixture Mainly Based on: 2,3-dihydro-6-[2-(1,1,2,2,2-pentamethyldisilan-1-yl)oxy-2-methyl-1-oxopropyl]-1,1,3-trimethyl-3-[4-(2-(1,1,2,2,2-pentamethyldisilan-1-yl)oxy-2-methyl-1-oxopropyl)phenyl]-1H-indene; 2,3-dihydro-5-[2-(1,1,2,2,2-pentamethyldisilan-1-yl)oxy-2-methyl-1-oxopropyl]-1,1,3-trimethyl-3-[4-(2-(1,1,2,2,2-pentamethyldisilan-1-yl)oxy-2-methyl-1-oxopropyl)phenyl]-1H-indene

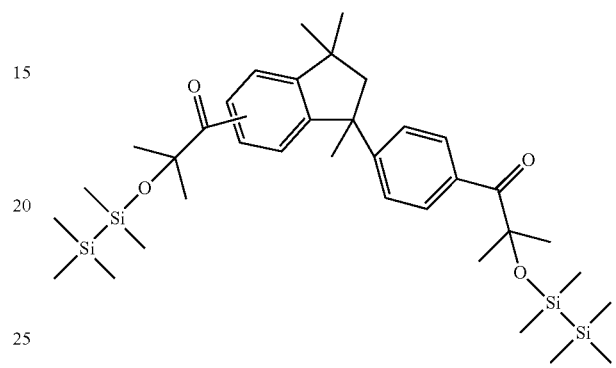

Esacure® ONE (A mixture mainly based on: 2,3-dihydro-6-(2-hydroxy-2-methyl-1-oxopropyl)-1,1,3-trimethyl-3-[4-(2-hydroxy-2-methyl-1-oxopropyl)phenyl]-1H-indene; 2,3-dihydro-5-(2-hydroxy-2-methyl-1-oxopropyl)-1,1,3-trimethyl-3-[4-(2-hydroxy-2-methyl-1-oxopropyl)phenyl]-1H-indene) (0.2 g, 0.489 mmol) and chloropentamethyldisilane (0.16 g, 0.977 mmol) were dissolved in 10 ml of dichloromethane and 0.07 g (0.977 mmol) of imidazole were added. The reaction mixture was stirred at room temperature for 3 h and then evaporated under vacuum. The crude material was diluted in 20 ml of toluene and filtered on silica gel. The solvent was removed under vacuum to give the pure product.

$^1$H NMR (CDCl3, δ ppm): 0.00 (m, 18H), 0.12 (m, 18H), 1.1 (s, 3H), 1.39 (s, 3H), 1.59 (m, 12H), 1.73 (s, 3H), 2.25 (d, 1H), 2.49 (m, 1H), 7.1-7.22 (m, 3H), 7.93-8.25 (m, 4H).

Example 12

Synthesis of 1-(9-butyl-9H-carbazol-3-yl)-2-methyl-2-[(1,1,2,2,2-pentamethyldisilan-1-yl)oxy]propan-1-one

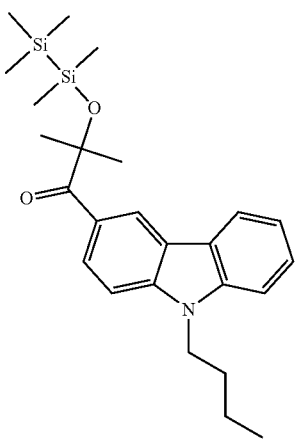 [SMILES: CCCCn1c2ccccc2c2cc(C(=O)C(C)(C)O[Si](C)(C)[Si](C)(C)C)ccc21]

N-butyl carbazole (3 g, 13.4 mmol) and alpha-bromoisobutirylbromide (3.67 g, 16 mmol) were dissolved in benzene 40 ml, further, aluminum chloride (1.78 g, 13.4 mmol) was added under stirring at 0° C. over a period of 30 minutes. The addition was completed, then stirred for 4 hours at 25° C. The reaction solution was poured into ice water 50 g, followed by extraction with benzene 100 ml. The organic layer was dried over magnesium sulfate, the drying agent was filtered off, then the residue was purified by silica gel column chromatography using Toluene/petroleum ether 6:1. The crude product was dissolved in dichloromethane 6 ml and treated at reflux for 5 h with 0.24 g of a solution 50% of NaOH. After dilution with 10 ml of water and 10 ml of dichloromethane, the phases were separated. The organic phase was washed with water, dried on sodium sulphate, filtered off and the solvent was evaporated under vacuum. The crude material was purified by flash column chromathography (dichloromethane/ethyl acetate 9:1) and used in the next step. 1-(9-butyl-9H-carbazol-3-yl)-2-hydroxy-2-methylpropan-1-one (0.5 g, 1.61 mmol) and chloropentamethyldisilane (0.26 g, 1.61 mmol) were dissolved in 5 ml of dichloromethane and 0.1 g (1.61 mmol) of imidazole were added. The reaction mixture was stirred at 30° C. for 3 h and then evaporated under vacuum. The crude material was purified by flash column chromathography (Toluene). The solvent was removed under vacuum to give the pure product. (0.3 g)

$^1$H NMR (CDCl$_3$, δ ppm): 0.00 (s, 9H), 0.18 (s, 6H), 0.92 (t, 3H), 1.4 (m, 2H), 1.65 (s, 6H), 1.85 (m, 2H), 4.32 (t, 2H) 7.2-7.5 (m, 4H), 8.14 (d, 1H), 8.40 (d, 1H), 9.14 (s, 1H).

Example 13

Comparative Tests

The α-disilyloxyketones of the invention, were compared with 2-methyl-2-(1,1,2,2,2-pentamethyldisilyloxy)-1-phenylpropan-1-one (COMP-1) of the prior art prepared as described in Macromolecules 2009, 42, 6031-6037 (PI-1) and 2-hydroxy-2-methyl-1-phenylpropanone (COMP-2).

Example 13.1

Comparative Tests

Example 13.1.1

Clear Formulation Mercury Lamp

The photopolymerizable compositions for the test were prepared dissolving the photoinitiators at a concentration of 3% by weight (wt) each in a mixture 99.5:0.5 wt of Ebecryl® 605 and Ebecryl® 350 (Allnex).

The photopolymerizable compositions placed in the sample lodgment of a FT-IR (FT-IR 430-Jasco), were exposed to a Mercury lamp (160 W) located at a distance of 65 mm from the sample and at an angle of 30°. IR spectra were acquired at constant time intervals during the photopolymerization and the reduction over the time of the area of the peaks at 1408 and 810 cm$^{-1}$ assigned to the acrylic double bonds was determined using the IR software. This allows quantifying the degree of polymerization and therefore the efficiency of the photoinitiator.

The results expressed as % of polymerization over the time, are reported in Table 3.

TABLE 3

| Photoinitiator | Mercury Lamp after 0.2" | Mercury Lamp after 1" |
|---|---|---|
| COMP-1* | 33 | 43 |
| COMP-2* | 42 | 51 |
| Example 1 | 32 | 46 |
| Example 2 | 62 | 72 |
| Example 3 | 65 | 70 |
| Example 4 | 54 | 64 |
| Example 5 | 66 | 73 |
| Example 6 | 33 | 49 |
| Example 7 | 76 | 83 |
| Example 8 | 60 | 73 |

*Comparative

These tests confirm that compounds of formula (Ia) and (II) have a reactivity comparable or superior than the comparative (COMP-1), when use in the same amount. The best performances were reached by the compound of example 5, in this case the reactivity was twice that of the reference compound (COMP-1).

Example 13.1.2

Clear Formulation LED Lamp (400 nm)

The photopolymerizable compositions for the test were prepared:

1. dissolving the photoinitiators at a concentration of 3% by weight (wt) each and 0.5% of isopropylthioxanthone (sensitizer) in a mixture 99.5:0.5 wt of Ebecryl® 605 and Ebecryl® 350 (Allnex) (Formulation A).
2. dissolving the photoinitiators at a concentration of 3% by weight (wt) each in a mixture 99.5:0.5 wt of Ebecryl® 605 and Ebecryl® 350 (Allnex) (Formulation B).

The photopolymerizable compositions placed in the sample lodgment of a FT-IR (FT-IR 430-Jasco), were exposed to a LED lamp (400 nm) located at a distance of 25 mm from the sample and at an angle of 30°. IR spectra were acquired at constant time intervals during the photopolymerization and the reduction over the time of the area of the peaks at 1408 and 810 cm$^{-1}$ assigned to the acrylic double bonds was determined using the IR software. This allows quantifying the degree of polymerization and therefore the efficiency of the photoinitiator.

The results expressed as % of polymerization over the time, are reported in Table 4.

TABLE 4

| Photoinitiator | Formulation A after 0.5" | Formulation B after 1" |
|---|---|---|
| COMP-1 | 36 | 0 |
| COMP-2* | 0 | 0 |
| Example 3 | 52 | 0 |
| Example 5 | 59 | 0 |
| Example 6 | 67 | 0 |

*Comparative

These tests demonstrate that compounds of formula (I), (Ia) and (II) can be sensitized and that are able to work with LED lamp, while this is not achievable for the comparative (COMP-2), which is a α-hydroxyketone.

All α-disilyloxyarylketone under examination were surprisingly found able to work with LED sources when in admixture with a sensitizer.

Example 13.1.3

Cyan Inkjet Ink Mercury Lamp

The photopolymerizable compositions placed in the sample lodgment of a FT-IR (FT-IR 430-Jasco), were exposed to a Mercury lamp (160 W) located at a distance of 65 mm from the sample and at an angle of 30°. IR spectra were acquired at constant time intervals during the photopolymerization and the reduction over the time of the area of the peaks at 1408 and 810 cm$^{-1}$ assigned to the acrylic double bonds was determined using the IR software. This allows quantifying the degree of polymerization and therefore the efficiency of the photoinitiator.

The results expressed as % of polymerization over the time, are reported in Table 5.

TABLE 5

| Photoinitiator | Mercury Lamp after 1" |
|---|---|
| COMP-1* | 0 |
| COMP-2* | 0 |
| Example 3 | 17 |
| Example 5 | 56 |

*Comparative

These tests confirm that compounds of formula (Ia) are more reactive than the comparatives.

Example 13.1.4

Cyan Inkjet Ink LED Lamp (400 nm)

The photopolymerizable compositions for the test were prepared:
1. dissolving the photoinitiators at a concentration of 5% by weight (wt) each and 0.5% of isopropylthioxanthone in a Cyan Inkjet Ink (Formulation A).
2. dissolving the photoinitiators at a concentration of 5% by weight (wt) each in a Cyan Inkjet Ink (Formulation B).

The photopolymerizable compositions placed in the sample lodgment of a FT-IR (FT-IR 430-Jasco), were exposed to a LED lamp (400 nm) located at a distance of 25 mm from the sample and at an angle of 30°. IR spectra were acquired at constant time intervals during the photopolymerization and the reduction over the time of the area of the peaks at 1408 and 810 cm$^{-1}$ assigned to the acrylic double bonds was determined using the IR software. This allows quantifying the degree of polymerization and therefore the efficiency of the photoinitiator.

The results expressed as % of polymerization over the time, are reported in Table 6,

TABLE 6

| Photoinitiator | Formulation A after 2" | Formulation B after 2" |
|---|---|---|
| COMP-2* | 0 | 0 |
| Example 3 | 39 | 0 |
| Example 5 | 44 | 0 |

*Comparative

These tests confirms that compounds of formula (I) can be sensitized also in pigmented system and so they are able to work with LED lamp, while this is not possible for the comparative (COMP-2).

The invention claimed is:

1. A photocurable composition comprising:
   a) from 50 to 99.9% by weight of at least one ethylenically unsaturated compound;
   b) from 0.1 to 35% by weight, of the solids content of at least one compound of formula (I) and/or (II)

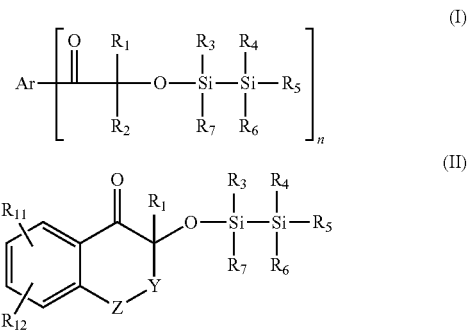

wherein:
  n is 1 or 2;
  when n is 1, Ar is selected form:
    a $C_6$-$C_{12}$ aryl which is unsubstituted or substituted by one or more substituents selected from the group consisting of halogens, —CN, —COOH, —OH, $C_1$-$C_{18}$ alkyl, —Oalkyl, —Ophenyl, —SH, —Salkyl, —Salkoxy, —Sphenyl, —SOalkyl, —SO$_2$alkyl, —SO$_2$alkoxy, —SO$_2$phenyl, —COOalkyl, SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl, —NHCOphenyl; and
  one of the following groups pyridyl, thienyl, 2-methylthienyl, pyrryl, furyl, indanyl, imidazolyl, thiazolyl, oxazolyl, tetrahydronaphthyl, naphthyl, benzothienyl, benzopyrryl, benzofuryl, benzoimidazolyl, benzothiazolyl, benzoxazolyl, 3,4-ethylenedioxythiophene, carbazolyl, N-alkylcarbazolyl, thianthrenyl, phenoxathiinyl, phenothiazinyl, phenoxazinyl, 5,10-dihydrophenazinyl; all said groups being optionally substituted by one or more electrodonating groups;
  when n is 2, Ar is selected from a $C_6$-$C_{12}$ arylene group, a $C_6$-$C_{12}$ heteroarylene group, and a -arylene-T-arylene- group selected from a -phenylene-T-phenylene- group and a trimethyl-phenyl-indane group selected from the one of formula

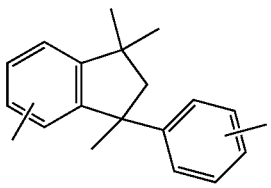

all said groups being optionally substituted by one or more electrodonating groups;
  Y is selected from a direct bond, —CH$_2$—, —CH$_2$—CH$_2$—, —O—, —S— and -Nalkyl;
  Z is selected from a direct bond, —O—, —S—, —SO$_2$—, -Nalk, —CH$_2$— and —C(CH$_3$)$_2$;

T is selected from a direct bond, —O—, —S—, —SO$_2$—, —CH$_2$—, —CH$_2$CH$_2$—, —CH$_2$OCH$_2$— and —CH=CH—;

R$_1$ is selected from, C1-C8 alkyl which is unsubstituted or substituted by C2-C8acyloxy, —NR$_8$R$_9$, —COOalkyl, or —CN, or represents C3-C5alkenyl, C5-C12cycloalkyl, phenyl and benzyl;

R$_2$ is selected from R$_1$ or R$_2$ represents a —CH$_2$CH$_2$R$_{10}$ group; or R$_1$ and R$_2$, together with the carbon atom to which they are bound, represent C5-C12cycloalkyl, C2-C8-alkylene or C3-C9oxa- or aza-alkylene;

R$_3$, R$_4$, R$_5$, R$_6$ and R$_7$, each independently, are selected from phenyl, C1-C8alkyl, both being unsubstituted or substituted by —OH, —Oalkyl, C2-C8acyloxy, —NR$_3$R$_9$, —COOalkyl or CN; and Oalkyl;

R$_8$ and R$_9$, each independently, are selected from C1-C18alkyl which is unsubstituted or substituted by —OH, —Oalkyl, or —CN;

R$_{10}$ is selected from —CONH2, —CONHalkyl, —CON(alkyl)$_2$ and —P(O)(Oalkyl)$_2$ R$_{11}$ is selected from hydrogen, halogen, —CN, —COOH, —OH, C1-C18 alkyl, —Oalkyl, —Oalkoxy, —Ophenyl, —SH, —Salkyl, —Salkoxy, —Sphenyl, —SOalk, —SO$_2$alkyl, —SO$_2$alkoxy, —SO$_2$phenyl, —COOalkyl, SO$_2$NH$_2$, —SO$_2$NHalkyl, —SO$_2$N(alkyl)$_2$, —NHalkyl, —NHalkoxy, —N(alkyl)$_2$, morfolino, piperidino, piperazino, —N(alkoxy)$_2$, —NHCOalkyl and —NHCOphenyl;

R$_{12}$ has one of the meanings assigned to R$_{11}$;

or R$_{11}$ and R$_{12}$, together with the carbon atoms to which they are bound, represent C5-C12cycloalkyl or C6-C12 aryl;

c) from 0.01 to 15% by weight of the solids content of at least one photosensitizer from the group of aromatic carbonyl compounds having triplet energy of 225-310 kJ/mol.

2. The photocurable composition of claim 1, wherein formula (I) Ar is selected from phenyl is phenyl, fluorophenyl, bromophenyl, chlorophenyl, dichlorophenyl, iodophenyl, cyanophenyl, naphthyl, phenanthryl, anthracyl, diphenylyl, mesityl, isopropylphenyl, isopropylchlorophenyl, phenoxyphenyl, p-nonylphenyl, C10-C13alkylphenyl, hydroxyphenyl, tolyl, chlorotolyl, tert-butylphenyl, xylyl, bromoxylyl, methoxyphenyl, ethoxyphenyl, phenoxyphenyl, methylthiophenyl, phenylthiophenyl, 4-methoxythioanisole, butylsulfophenyl, phenylsulfophenyl, ethoxycarbonylphenyl, tert-butoxycarbonylphenyl, methylaminosulfophenyl, dipropylaminosulfophenyl, dimethylaminophenyl, 4-morpholinophenyl, benzoylaminophenyl, acetylaminophenyl, pyridyl thienyl, 2-methylthienyl, furyl, indanyl, thiazolyl, oxazolyl, tetrahydronaphthyl, benzothienyl, benzopyrryl, benzofuryl, carbazolyl, N-alkylcarbazolyl, thianthrenyl, phenoxathiinyl, phenothiazinyl, phenoxazinyl, 5,10-dihydrophenazinyl.

3. The photocurable composition of claim 1 wherein in formula (I) n is 1.

4. The photocurable composition of claim 1 wherein formula (I) and (II) R$_3$, R$_4$, R$_5$, R$_6$, R$_7$ are each independently methyl, ethyl or phenyl.

5. The photocurable composition of claim 1 wherein in formula (II) R$_{11}$ and R$_{12}$ are hydrogen.

6. The photocurable composition of claim 1 wherein the photosensitizer c) are thioxanthones and ketocoumarins.

7. The photocurable composition of claim 1 comprising:
a) from 70 to 98.9% by weight, of the solids content of at least one ethylenically unsaturated compound;
b) from 0.1 to 20% by weight of the solids content of at least one compound of formula (I) and/or (II)
c) from 0.01 to 10% by weight of the solids content of at least one photosensitizer from the group of aromatic carbonyl compounds having triplet energy of 225-310 kJ/mol.

8. The photocurable composition of claim 1 further comprising:
f) from 0.5 to 15% by weight of another photoinitiator.

9. A photoinitiator of formula (Ia) and (II):

$$Ar'-\left[\begin{array}{c} O \\ \| \\ C \end{array} \begin{array}{c} R_1 \\ | \\ C \\ | \\ R_2 \end{array} -O-\begin{array}{c} R_3 \\ | \\ Si \\ | \\ R_7 \end{array} -\begin{array}{c} R_4 \\ | \\ Si-R_5 \\ | \\ R_6 \end{array}\right]_n \quad (Ia)$$

$$\begin{array}{c} R_{11} \\ \\ R_{12} \end{array} \text{(ring with C=O, R}_1\text{, O-Si-Si-R}_5\text{, Y, Z)} \quad (II)$$

wherein:
n is 1 or 2;

when n is 1, Ar' is selected form one of the following groups: C6-C12 aryl, thienyl; 2-methylthienyl; furyl; indanyl; thiazolyl; oxazolyl; tetrahydronaphthyl; benzothienyl; benzopyrryl; benzofuryl; carbazolyl; N-alkylcarbazolyl, thianthrenyl; phenoxathiinyl; phenothiazinyl; phenoxazinyl; and 5,10-dihydrophenazinyl; all said groups being optionally substituted by one or more electrodonating groups; provided that when C6-C12 aryl is a phenyl group then said phenyl group is always substituted by one or more electrodonating groups;

when n is 2, Ar is selected from a C6-C12 arylene group, a C6-C12 heteroarylene group, and a -arylene-T-arylene- group selected from a -phenylene-T-phenylene- group and a trimethyl-phenyl-indane group selected from the one of formula all said groups being optionally substituted by one or more electrodonating groups;

Y is selected from a direct bond, —CH$_2$—, —CH$_2$—CH$_2$—, —O—, —S— and —Nalkyl;

Z is selected from a direct bond, —O—, —S—, —SO$_2$—, —Nalk, —CH$_2$— and —C(CH$_3$)$_2$;

T is selected from a direct bond, —O—, —S—, —SO$_2$—, —CH$_2$—, —CH$_2$CH$_2$—, —CH$_2$OCH$_2$— and —CH=CH—;

R₁ is selected from hydrogen, C1-C8 alkyl which is unsubstituted or substituted by C2-C8acyloxy, —NR₃R₉, —COOalkyl, or —CN, or represents C3-C5alkenyl, C5-C12cycloalkyl, phenyl and benzyl;

R₂ is selected from R₁ or R₂ represents a —CH₂CH₂R₁₀ group; or R₁ and R₂, together with the carbon atom to which they are bound, represent C5-C12cycloalkyl, C2-C8-alkylene or C3-C9oxa-alkylene or aza-alkylene;

R₃, R₄, R₅, R₆ and R₇, each independently, are selected from phenyl, C1-C8alkyl, both being unsubstituted or substituted by —OH, —Oalkyl, C2-C8acyloxy, —NR₃R₉, —COOalkyl or CN; or Oalkyl;

R₈ and R₉, each independently, are selected from C1-C18alkyl which is unsubstituted or substituted by —OH, —Oalkyl, or —CN;

R₁₀ is selected from —CONH₂, —CONHalkyl, —CON(alkyl)₂ and —P(O)(Oalkyl)₂;

R₁₁ is selected from hydrogen, halogen, —CN, —COOH, —OH, C1-C18 alkyl, —Oalkyl, Ophenyl, —SH, —Salkyl, —Salkoxy, —Sphenyl, —SOalk, —SO₂ alkyl, —SO₂ alkoxy, —SO₂ phenyl, —COOalkyl, SO₂NH₂, —SO₂NHalkyl, —SO₂N(alkyl)₂, —NHalkyl, —NHalkoxy, —N(alkyl)₂, morfolino, piperidino, piperazino, —N(alkoxy)₂, —NHCOalkyl and —NHCOphenyl;

R₁₂ has one of the meanings assigned to R₁₁;

or R₁₁ and R₁₂, together with the carbon atoms to which they are bound, represent C5-C12cycloalkyl or C6-C12 aryl;

and wherein:

when R₁ and R₂, together with the carbon atom to which they are bound represent C5-C12cycloalkyl, C2-C8-alkylene or C3-C9oxa- or aza-alkylene, then Ar' can also be unsubsituted.

10. The photoinitiator of claim 9, wherein in formula (Ia) Ar' is selected from
a substituted phenyl and
a group selected from naphthyl, phenanthryl, anthracyl, diphenylyl, mesityl, isopropylphenyl, phenoxyphenyl, p-nonylphenyl, C10-C13alkylphenyl, hydroxyphenyl, tolyl, tert-butylphenyl, xylyl, methoxyphenyl, ethoxyphenyl, phenoxyphenyl, methylthiophenyl, phenylthiophenyl, 4-methoxythioanisole, butylsulfophenyl, phenylsulfophenyl, ethoxycarbonylphenyl, tert-butoxycarbonylphenyl, methylaminosulfophenyl, dipropylaminosulfophenyl, dimethylaminophenyl, 4-morpholinophenyl, benzoylaminophenyl, acetylaminophenyl, thienyl, 2-methylthienyl, furyl, indanyl, thiazolyl, oxazolyl, tetrahydronaphthyl, benzothienyl, benzopyrryl, benzofuryl, carbazolyl, N-alkylcarbazolyl, thianthrenyl, phenoxathiinyl, phenothiazinyl, phenoxazinyl and 5,10-dihydrophenazinyl.

11. The photoinitiator of claim 9 wherein in formula (Ia) n is 1.

12. The photoinitiator of claim 9 wherein formula (Ia) and (II) R₃, R₄, R₅, R₆, R₇ are, each independently one to one other, methyl, ethyl or phenyl.

13. The photoinitiator of claim 9 wherein in formula (II) R₁₁ and R₁₂ are hydrogen.

14. A process for photocuring photopolymerizable compositions and inks, which process comprises:
I) preparing a photopolymerizable composition comprising:
at least a), b) and c), as defined in claim 1;
II) coating or printing said photopolymerizable composition onto a substrate, and
III) photopolymerizing said coated or printed composition with a light source on said substrate.

15. The process of claim 14, wherein the photopolymerization is carried out with a LED light source emitting a wavelength comprised between 365 nm to 600 nm.

16. A method for broadening the spectral working wavelength of α-disilyloxyarylketones, which comprising adding a sensitizer to said α-disilyloxyarylketones.

* * * * *

UNITED STATES PATENT AND TRADEMARK OFFICE
CERTIFICATE OF CORRECTION

PATENT NO. : 11,834,532 B2  
APPLICATION NO. : 17/296343  
DATED : December 5, 2023  
INVENTOR(S) : Marika Morone et al.

Page 1 of 1

It is certified that error appears in the above-identified patent and that said Letters Patent is hereby corrected as shown below:

On the Title Page

Column 1, Item (72) Inventors:
"Marika Robert Morone, Liporno (IT)" should read --Marika Morone, Liporno (IT)--

Signed and Sealed this  
Twentieth Day of February, 2024

Katherine Kelly Vidal  
*Director of the United States Patent and Trademark Office*